US008922068B2

(12) United States Patent
Trammell

(10) Patent No.: US 8,922,068 B2
(45) Date of Patent: Dec. 30, 2014

(54) LINEAR DRIVE MOTOR WITH IMPROVED BEARING SYSTEM

(75) Inventor: Glenn S. Trammell, Fort Smith, AR (US)

(73) Assignee: Baldor Electric Company, Fort Smith, AR (US)

(*) Notice: Subject to any disclaimer, the term of this patent is extended or adjusted under 35 U.S.C. 154(b) by 328 days.

(21) Appl. No.: 13/232,766

(22) Filed: Sep. 14, 2011

(65) Prior Publication Data

US 2013/0015725 A1  Jan. 17, 2013

Related U.S. Application Data

(63) Continuation-in-part of application No. 13/179,959, filed on Jul. 11, 2011, and a continuation-in-part of application No. 13/180,017, filed on Jul. 11, 2011, now Pat. No. 8,418,350.

(51) Int. Cl.
*H02K 41/02* (2006.01)
*H02K 41/03* (2006.01)
*H02K 7/08* (2006.01)
*H02K 29/12* (2006.01)
*H02K 7/09* (2006.01)

(52) U.S. Cl.
CPC ............. *H02K 41/031* (2013.01); *H02K 7/08* (2013.01); *H02K 29/12* (2013.01); *H02K 7/09* (2013.01)
USPC .................. 310/12.31; 310/12.18; 310/12.26; 310/12.29

(58) Field of Classification Search
CPC ............................. H02K 41/031; H02K 7/08
USPC ....................... 310/12.18, 12.26, 12.29, 12.31
See application file for complete search history.

(56) References Cited

U.S. PATENT DOCUMENTS

| | | | |
|---|---|---|---|
| 3,336,488 A * | 8/1967 | Scott | 310/24 |
| RE27,436 E | 7/1972 | Sawyer | |
| 3,851,196 A | 11/1974 | Hinds | |
| 3,867,676 A * | 2/1975 | Chai et al. | 318/135 |
| 3,950,663 A | 4/1976 | Mead | |
| 4,037,122 A * | 7/1977 | Bonner et al. | 310/14 |
| 4,044,881 A * | 8/1977 | Chai et al. | 400/279 |
| 4,078,192 A | 3/1978 | Fultz | |
| 4,315,171 A | 2/1982 | Schaeffer | |

(Continued)

OTHER PUBLICATIONS

Office Action for U.S. Appl. No. 13/180,017 dated Oct. 17, 2012.

(Continued)

*Primary Examiner* — Alex W Mok
(74) *Attorney, Agent, or Firm* — Thompson Coburn LLP

(57) ABSTRACT

A primary for a linear drive motor has first and second stacks, each with inner and outer teeth and a bearing mount. A magnet is disposed between the first and second stacks, and a coil wrapped is between the first and second stacks. A bearing is operatively mounted to at least one of the bearing mounts of the first and second stacks. The outer teeth of the first and second stacks may have a projection comprising the bearing mount. The bearing mount may be embedded within the stacks. The stacks may be assembled in a housing and the housing may have a first bearing outboard of the first stack, a second bearing outboard of the second stack, and a third bearing in staggered relationship with the first and second bearings across the housing in an arrangement bilaterally symmetric about an axis transverse to the direction of travel.

22 Claims, 19 Drawing Sheets

(56) References Cited

U.S. PATENT DOCUMENTS

| | | | |
|---|---|---|---|
| 4,335,338 A * | 6/1982 | Sawyer | 318/135 |
| 4,404,509 A | 9/1983 | Hartwig | |
| 4,509,001 A * | 4/1985 | Wakabayashi et al. | 318/687 |
| 4,644,199 A * | 2/1987 | Langley | 310/12.29 |
| 4,661,730 A | 4/1987 | Maruyama et al. | |
| 4,725,750 A | 2/1988 | Welch | |
| 4,749,921 A | 6/1988 | Chitayat | |
| 4,757,220 A | 7/1988 | Pouillange | |
| 4,887,914 A | 12/1989 | Lin et al. | |
| 4,912,746 A | 3/1990 | Oishi | |
| 4,922,143 A | 5/1990 | Gosdowski et al. | |
| 4,972,108 A | 11/1990 | Venturini | |
| 5,023,495 A | 6/1991 | Ohsaka et al. | |
| 5,302,873 A * | 4/1994 | Takei | 310/12.24 |
| 5,334,892 A | 8/1994 | Chitayat | |
| 5,416,396 A * | 5/1995 | Takei | 318/653 |
| 5,601,681 A | 2/1997 | Bayro | |
| 5,642,013 A | 6/1997 | Wavre | |
| 5,723,917 A | 3/1998 | Chitayat | |
| 5,841,207 A | 11/1998 | Correns et al. | |
| 5,887,334 A * | 3/1999 | Dooris et al. | 29/596 |
| 5,910,691 A | 6/1999 | Wavre | |
| 5,965,962 A | 10/1999 | Hinds | |
| 6,160,327 A | 12/2000 | Wang | |
| 6,215,260 B1 | 4/2001 | Hinds | |
| 6,242,822 B1 | 6/2001 | Strothmann et al. | |
| 6,404,089 B1 * | 6/2002 | Tomion | 310/162 |
| 6,522,035 B1 | 2/2003 | Smit | |
| 6,528,905 B1 * | 3/2003 | Hwang et al. | 310/12.29 |
| 6,798,089 B1 | 9/2004 | Smit | |
| 6,891,285 B2 * | 5/2005 | Harned et al. | 310/12.01 |
| 6,954,009 B2 | 10/2005 | Nakamura et al. | |
| 7,133,115 B2 | 11/2006 | Nawata et al. | |
| 7,148,590 B1 * | 12/2006 | Lampson | 310/12.18 |
| 7,230,355 B2 | 6/2007 | Lin et al. | |
| 7,566,997 B2 | 7/2009 | Trammell | |
| 7,934,307 B2 | 5/2011 | Trammell | |
| 8,418,350 B2 | 4/2013 | Trammell et al. | |
| 2004/0263000 A1 | 12/2004 | Vreugdewater et al. | |
| 2005/0140214 A1 * | 6/2005 | Arai | 310/12 |
| 2005/0211920 A1 | 9/2005 | Shibata | |
| 2006/0028070 A1 * | 2/2006 | Sahin Nomaler | 310/12 |
| 2006/0131966 A1 * | 6/2006 | Janisiewicz et al. | 310/12 |
| 2006/0138874 A1 * | 6/2006 | Janisiewicz et al. | 310/12 |
| 2006/0175907 A1 * | 8/2006 | Shikayama et al. | 310/12 |
| 2006/0279140 A1 * | 12/2006 | Jenny | 310/12 |
| 2008/0157607 A1 * | 7/2008 | Scheich et al. | 310/12 |
| 2008/0224548 A1 * | 9/2008 | Morel | 310/12 |
| 2009/0072634 A1 * | 3/2009 | Vollmer | 310/12 |
| 2009/0096297 A1 * | 4/2009 | Kim et al. | 310/12 |
| 2009/0218893 A1 * | 9/2009 | Kawai | 310/12.24 |
| 2010/0060087 A1 * | 3/2010 | Aso et al. | 310/12.29 |
| 2010/0231058 A1 * | 9/2010 | Hoppe | 310/12.18 |
| 2013/0015724 A1 | 1/2013 | Trammell et al. | |
| 2013/0015726 A1 | 1/2013 | Trammell | |

OTHER PUBLICATIONS

International Search Report and Written Opinion for PCT/US2012/046004 dated Mar. 26, 2013.

Patent Abstract, JP Publication No. 57-135666, published Aug. 21, 1982, Figures 1, 2.

Patent Abstract, JP Publication No. 57-151260, published Sep. 18, 1982, FIgure 1.

Patent Abstract, JP Publication No. 57-168986, published Oct. 25, 1982, Figures 1, 2.

Patent Abstract, JP Publication No. 61-251467, published Nov. 8, 1986, Figures 1, 2.

Patent Abstract, JP Publication No. 56-068263, published Jun. 8, 1981.

* cited by examiner

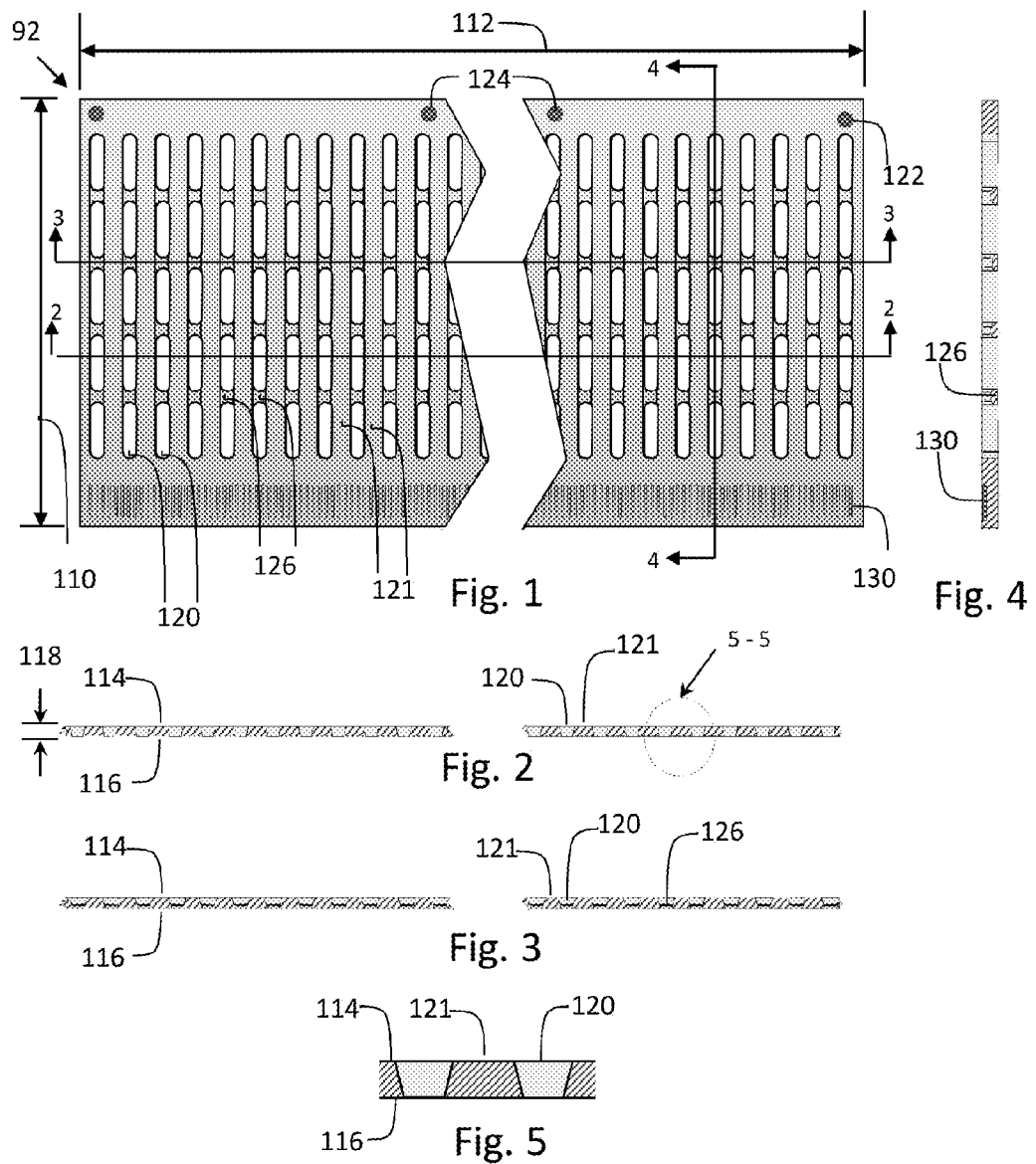

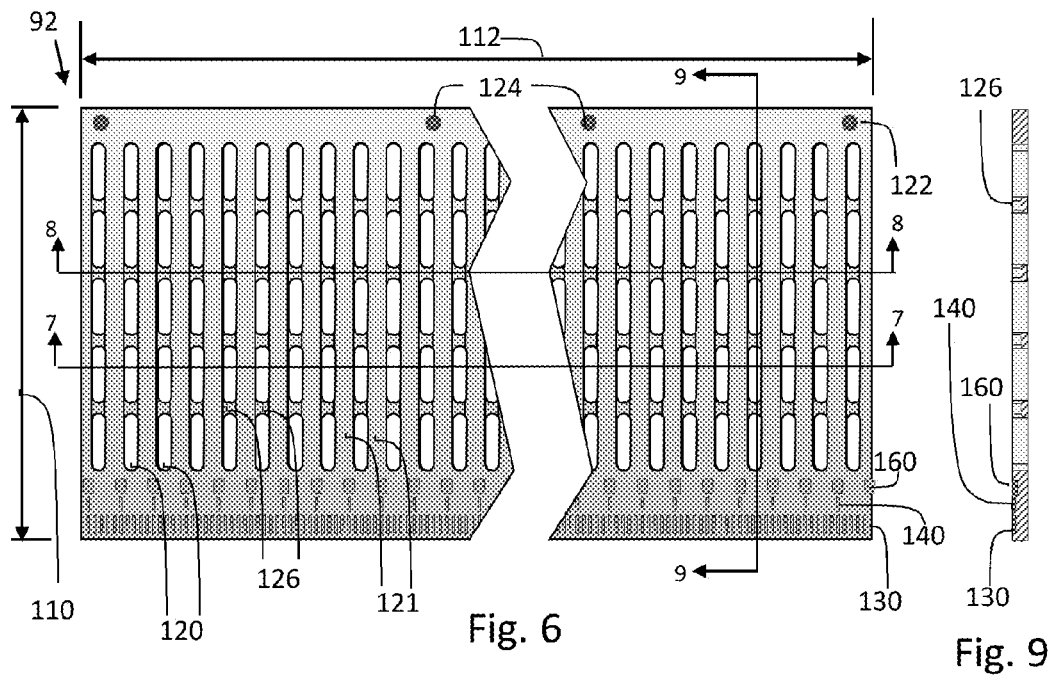
Fig. 6
Fig. 9
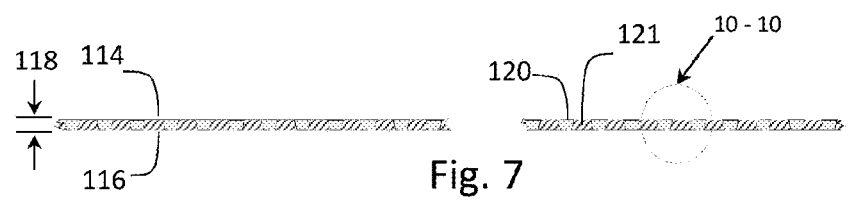
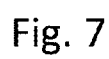
Fig. 7
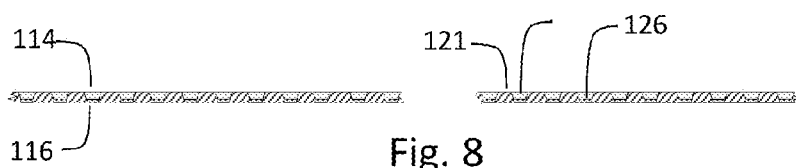
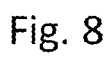
Fig. 8
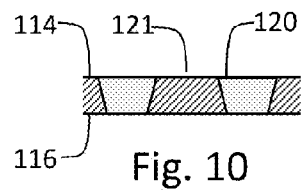
Fig. 10

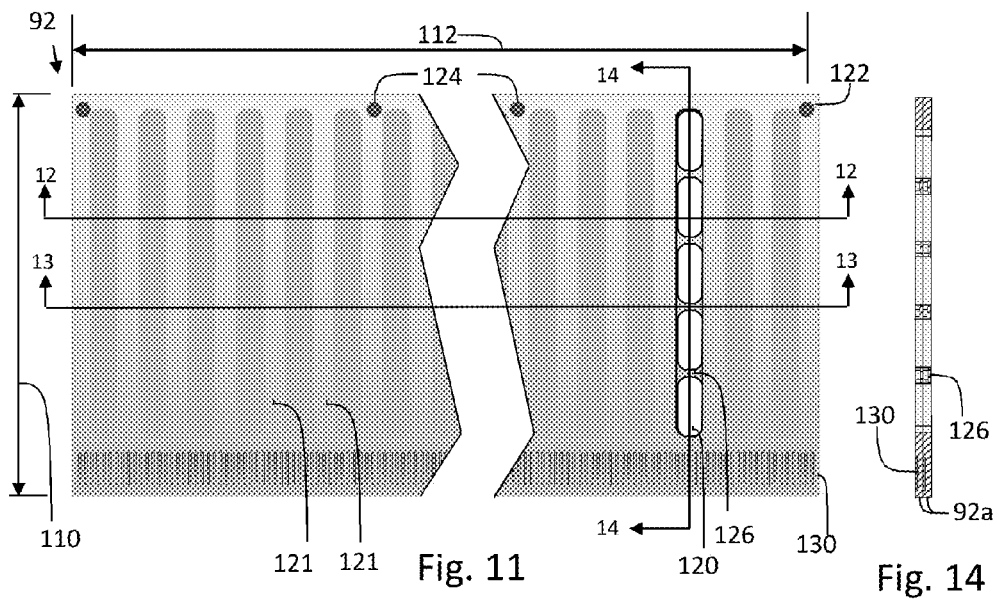
Fig. 11
Fig. 14
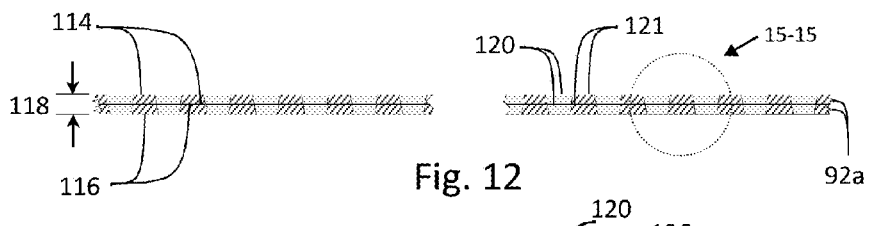
Fig. 12
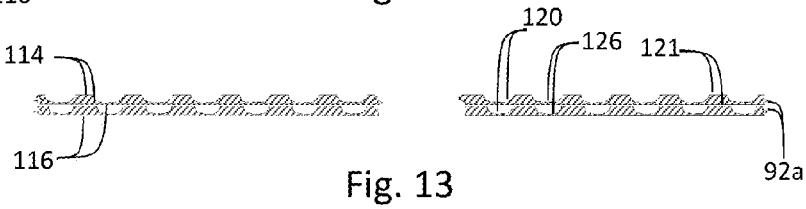
Fig. 13
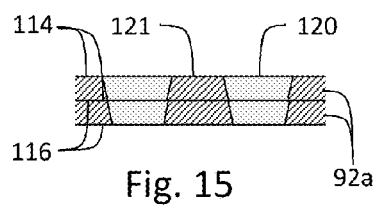
Fig. 15

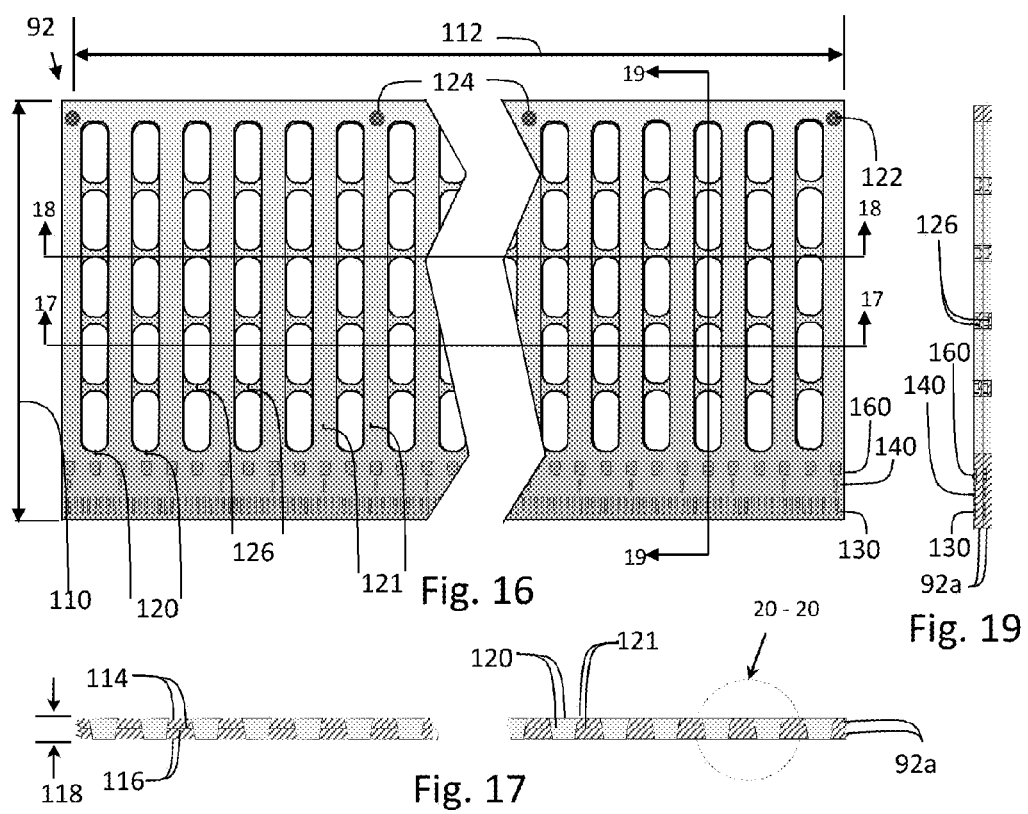

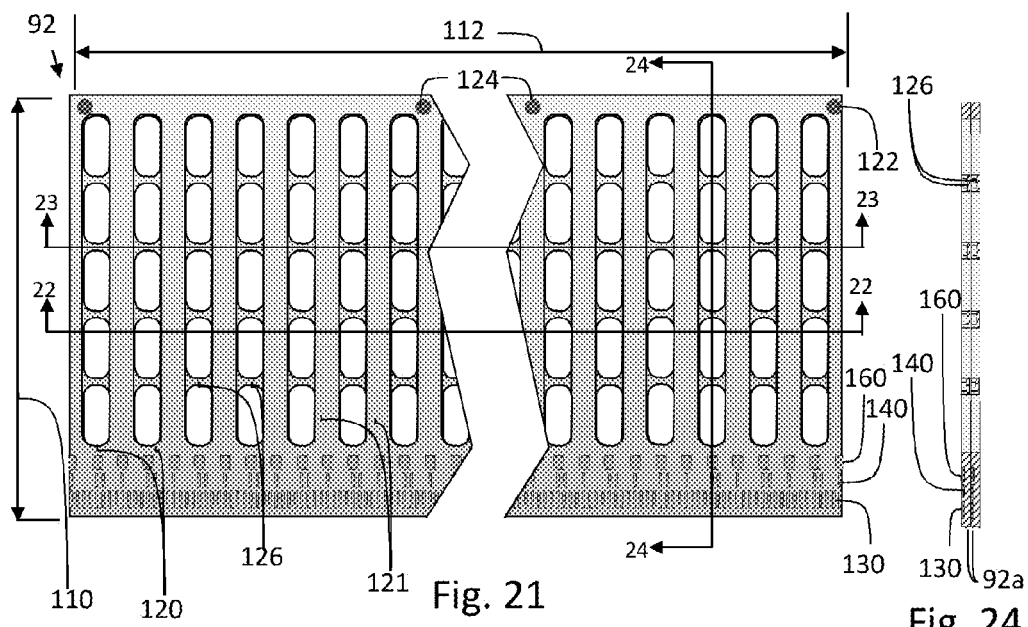
Fig. 21
Fig. 24
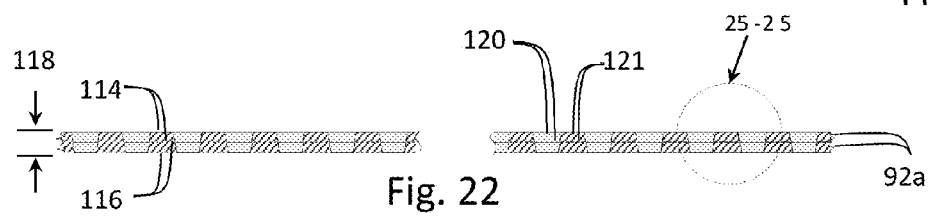
Fig. 22
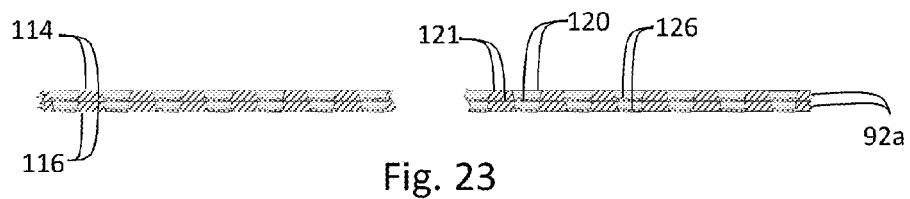
Fig. 23
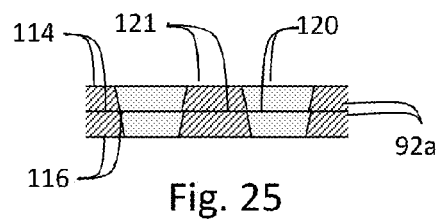
Fig. 25

US 8,922,068 B2

LINEAR DRIVE MOTOR WITH IMPROVED BEARING SYSTEM

CROSS REFERENCE TO RELATED APPLICATIONS

This application is a continuation-in-part application of application Ser. Nos. 13/179,959 and 13/180,017, both of which were filed on Jul. 11, 2011, and are currently co-pending, the disclosures of which are both incorporated by reference herein.

BACKGROUND

This disclosure relates to linear drive motors, including synchronous linear drive motors. The disclosure relates to primaries and secondaries for such motors, including stationary and moving primaries, stationary and moving secondaries, and further including secondaries with and without magnets. In one aspect, as will be described in more detail below, a thin sheet of magnetic permeable material is formed with slots extending through the material to form teeth of the secondary and the sheet may also have pockets or recesses formed simultaneously with the motor teeth to eliminate manufacturing or alignment variances. Some of the pockets or recesses may form teeth to be used as part of an encoder scale for the motor and other of the pockets or recesses may be used as part of one or more sensors to provide positioning information for the motor, as well as sensors for the drive components regulating commutation of the motor, i.e., commutation teeth. In another aspect, the pockets used to provide the encoder and commutation functions may be aligned with small magnets installed in the secondary which are seen by the encoder as "home" positions or limits. Yet in another aspect, pockets or recesses are added in the sheet and synchronized with the commutation and encoder teeth to provide "absolute position" on a given platen secondary, thereby enabling the drive for the motor to be flexibly programmed, and the identifying of specific platen secondaries when many are strung together in a line and the providing of "absolute position" for the entire string. Thus, the concepts described herein provide for simultaneous formation (and synchronization) of the motor teeth with the encoder teeth and/or commutation teeth as well as other drive system components. A sheet formed in such a way to form a secondary eliminates the need of conventional "Hall Effect" devices and inherently minimizes problems with establishing or maintaining motor commutation, for instance, motor commutation in sinusoidally commutated linear motors with platens having separate encoder scales that were attached after the teeth in the platen were created. A sheet formed in the way described herein reduces variation, thereby enabling the "electrical angle or commutation angle offset" of a motor to be standardized which in turn reduces set-up and calibration times while providing increased flexibility. Moreover, a drive may electrically couple a primary to a secondary in a string of secondaries and continues with the same commutation pattern between the motor and encoder teeth used in the previous secondary without needing to re-establish phasing in the next secondary. Motion is not slowed down or stopped to perform a "phase search" or read a "Hall Effect" sensor. The primary may also be formed from a solid steel stack and with reduced bearing requirements to work with the secondary to provide advantages in end user applications.

BRIEF DESCRIPTION OF THE DRAWINGS

FIG. 1 is a plan view of one embodiment of a sheet for a platen segment comprising motor teeth etched through the sheet and encoder teeth comprising partially etched pockets or teeth synchronized with the motor teeth;

FIG. 2 is a cross sectional view of the sheet taken along lines 2-2 of FIG. 1;

FIG. 3 is a cross sectional view of the sheet taken along lines 3-3 of FIG. 1;

FIG. 4 is a cross sectional view of the sheet taken along lines 4-4 of FIG. 1;

FIG. 5 is an enlarged cross-section view taken from detail area 5-5 of FIG. 2;

FIG. 6 is a plan view of another embodiment of a sheet for a platen segment comprising motor teeth etched through the sheet, encoder teeth comprising partially etched pockets synchronized with the motor teeth, commutation teeth comprising partially etched pockets synchronized with the motor teeth, and magnet locators comprising partially etched pockets synchronized with the motor teeth and used as homes, limits or reference marks for drive functions;

FIG. 7 is a cross sectional view of the sheet taken along lines 7-7 of FIG. 6;

FIG. 8 is a cross sectional view of the sheet taken along lines 8-8 of FIG. 6;

FIG. 9 is a cross sectional view of the sheet taken along lines 9-9 of FIG. 6;

FIG. 10 is an enlarged cross-section view taken from detail area 10-10 of FIG. 6;

FIG. 11 is a plan view of another embodiment of a sheet for a platen segment comprising stacked laminations with slots etched through each of the laminations having epoxy thereover and forming motor teeth, and encoder teeth comprising partially etched pockets in the top lamination synchronized with the motor teeth, where the motor teeth have a greater pitch that than shown in the sheet of FIG. 1;

FIG. 12 is a cross sectional view of the sheet taken along lines 12-12 of FIG. 11;

FIG. 13 is a cross sectional view of the sheet taken along lines 13-13 of FIG. 11;

FIG. 14 is a cross sectional view of the sheet taken along lines 14-14 of FIG. 11;

FIG. 15 is an enlarged cross-section view taken from detail area 15-15 of FIG. 12;

FIG. 16 is a plan view of another embodiment of a sheet for a platen segment comprising stacked laminations with motor teeth etched through each of the laminations, with encoder teeth comprising partially etched pockets serving as reference marks or teeth in the top lamination synchronized with the motor teeth, commutation teeth comprising partially etched pockets in the top lamination synchronized with the motor teeth, and magnet locators comprising partially etched pockets used as homes, limits or reference marks for drive functions in the top lamination which are synchronized with the motor and commutation teeth;

FIG. 17 is a cross sectional view of the sheet taken along lines 17-17 of FIG. 16;

FIG. 18 is a cross sectional view of the sheet taken along lines 18-18 of FIG. 16;

FIG. 19 is a cross sectional view of the sheet taken along lines 19-19 of FIG. 16;

FIG. 20 is an enlarged cross-section view taken from detail area 20-20 of FIG. 16;

FIG. 21 is a plan view of another embodiment of a sheet for a platen segment comprising stacked laminations with motor teeth etched through each of the laminations, with encoder teeth comprising partially etched pockets in the top lamination synchronized with the motor teeth, commutation teeth comprising partially etched pockets in the top lamination synchronized with the motor teeth and including additional reference markers in the commutation track, and magnet locators comprising partially etched pockets for locators for small magnets in the top lamination synchronized with the motor and commutation teeth;

FIG. 22 is a cross sectional view of the sheet taken along lines 22-22 of FIG. 21;

FIG. 23 is a cross sectional view of the sheet taken along lines 23-23 of FIG. 21;

FIG. 24 is a cross sectional view of the sheet taken along lines 24-24 of FIG. 21;

FIG. 25 is an enlarged cross-section view taken from detail area 25-25 of FIG. 22;

DETAILED DESCRIPTION

Figure 26:
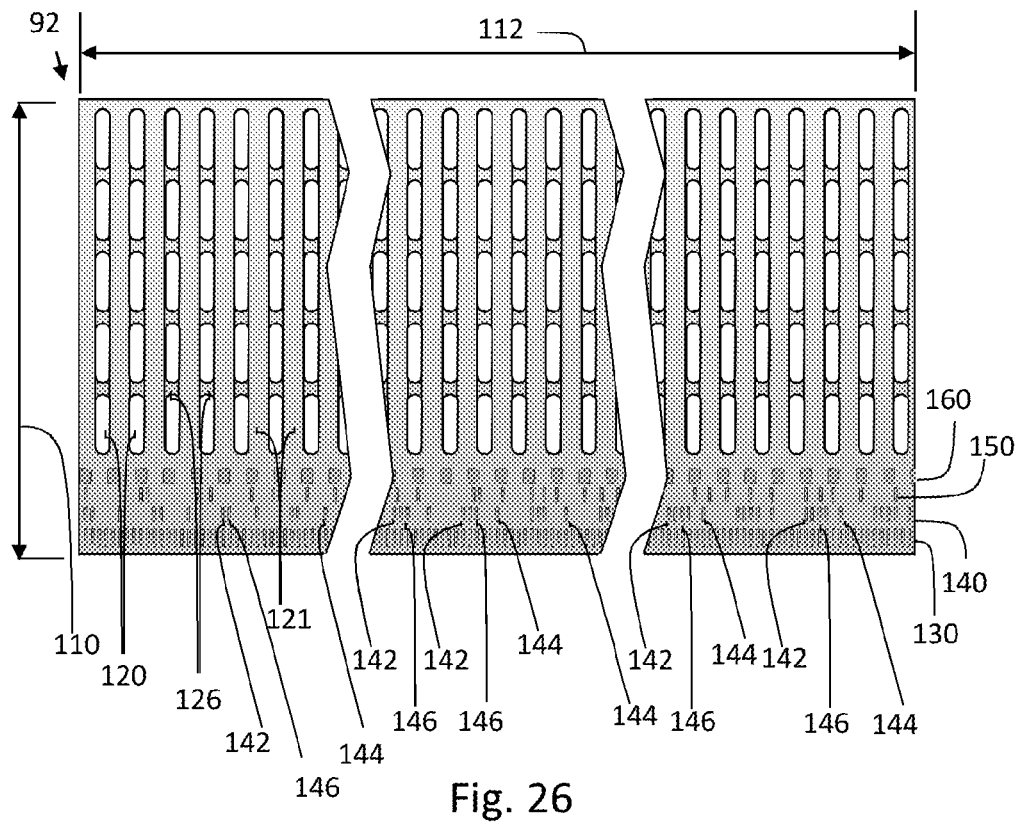
FIG. 26 is a plan view of an alternate embodiment of a sheet of a platen segment comprising a motor teeth etched through the sheet, with encoder teeth comprising partially etched pockets in the sheet synchronized with the motor teeth, commutation teeth comprising partially etched pockets in the sheet synchronized with the motor teeth, a track with additional reference markers comprising partially etched pockets in the sheet synchronized with the motor teeth, and partially etched pockets comprising magnet locators in the sheet synchronized with the motor teeth.
Figure 27:
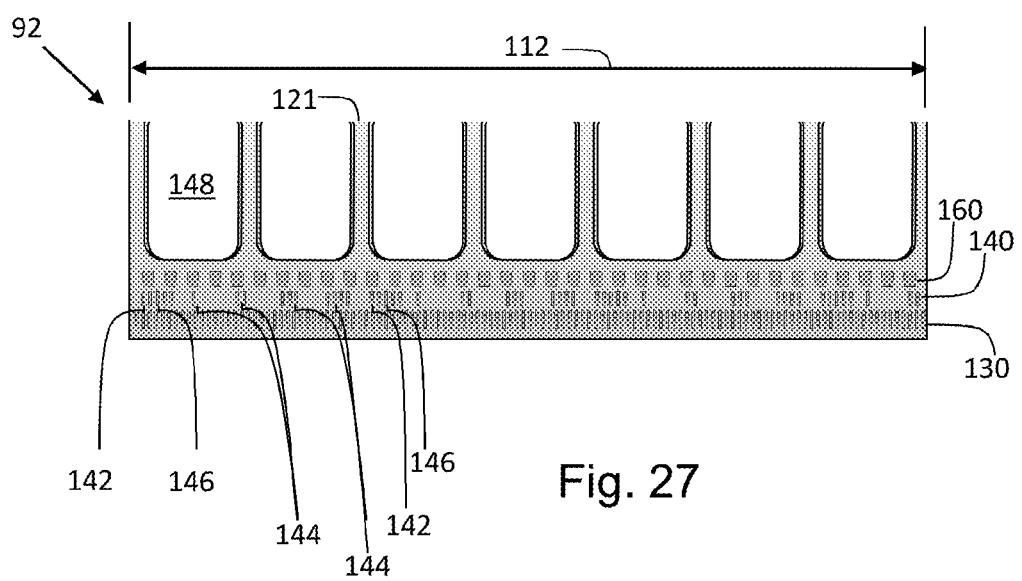
FIG. 27 is an enlarged plan view of an alternate embodiment of a platen comprising slots etched through the sheet to hold motor magnets of a secondary, with encoder teeth comprising partially etched pockets in the sheet synchronized with the secondary magnet slots, commutation teeth comprising partially etched pockets in the sheet synchronized with the motor teeth with additional reference markers, and partially etched pockets comprising magnet locators in the sheet synchronized with the motor teeth.
Figures 32, 33, 34:
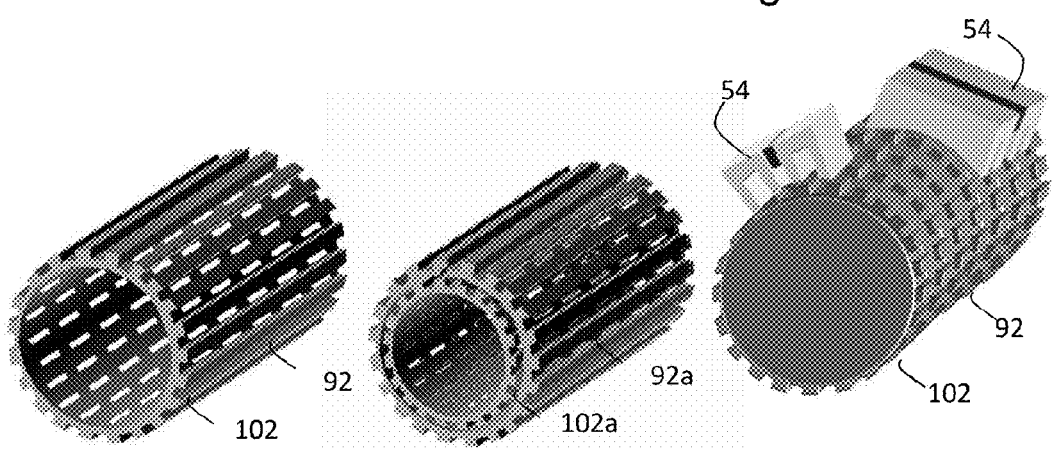
FIG. 32 is an alternate embodiment of a rotary motor with a single sheet spot welded to form a rotary motor primary.
FIG. 33 is an alternate embodiment of two sheets formed in a tubular shape and concentrically disposed about each other to form a rotary motor primary.
FIG. 34 is an alternate embodiment of a rotary or limited or unlimited torque motor with an integrated vertical "z"-axis motor with motor stacks arranged orthogonally to create multi-axis capability.

The description of the parent applications is in reference to a secondary for a linear drive motor. The secondary is shown in FIGS. 1-26 and 28-29. The principles described in the parent applications may be used in connection with a rotary motor as shown in FIGS. 32-34, or permanent magnet linear motor with magnets in the secondary like an iron core motor or even a cog-free, for instance, as shown in FIG. 27. Additionally, the principles described in the parent applications relate to a linear drive motor where the primary moves and the secondary is stationary, and also a stationary primary and a moving secondary, for instance, in a CNC conveyor system that moves and sorts items sitting on or fixtured to one or more platen segments, or positions items in a precise way, for instance, in automated assembly, machining or manufacture. The description herein is directed to the primary and a bearing system that may be used in connection with the secondaries described in the parent applications. The descriptions herein and in the parent applications should not be viewed in any limiting way. As with the parent applications, for purposes of illustration, a linear drive motor with a moving primary and a stationary secondary will be described.

Motor Primary

The parent applications described and illustrated embodiments of linear drive motor primaries with reference to FIGS. 28-31 and 35-36. Additional embodiments of the linear drive motors are described below with reference to FIGS. 37-55.

Figure 28:
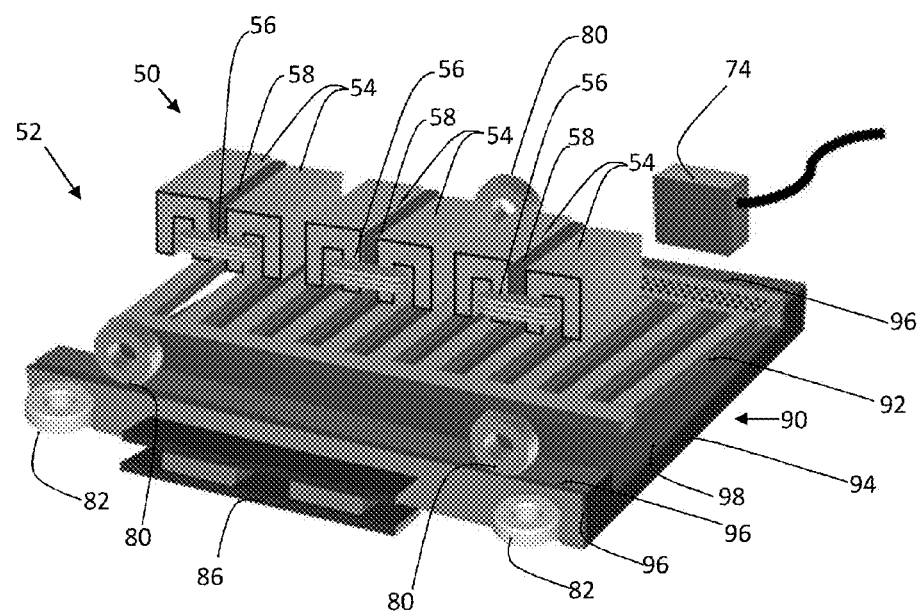
FIG. 28 is an exploded perspective view of a single axis linear drive motor with a housing enclosure not shown but showing a primary comprising three motor stacks, a secondary comprising a sheet formed in the manner shown by any of the sets of figures above, a secondary support base for the sheet with integrated bearing rails, an encoder, a side magnetic preload; and a top and side bearing system for primary and a bearing system for the primary.
Figure 29:
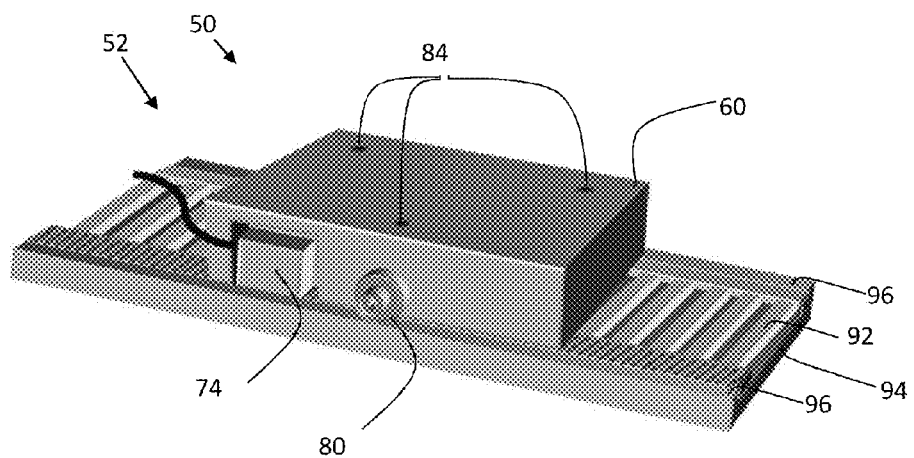
FIG. 29 shows the single axis linear drive motor of FIG. 28 with components assembled into a housing from a perspective view opposite that of FIG. 28.

Referring to FIGS. 28-31 and 35-36, the linear drive motor 50 comprises a moving primary carriage 52 with solid steel stacks 54 containing coils 56 and magnets 58. The solid steel stacks are preferred in that they are much simpler in design and they may be machined from a single piece of steel rather than from laminations that are stamped, stacked and bonded together. Also, the solid steel stacks provide their own integral support without having to add intermediate supports. Other advantages of the solid steel stack are discussed in further detail below. The moving primary carriage 52 may also comprise a machined housing 60 that holds the solid steel stacks, coils and magnets. The housing may also be an extruded piece. FIG. 28 shows the exploded view of the motor primary without a housing and FIG. 29 shows the linear motor with the housing 60 enclosing the primary carriage components. The solid steel stacks 54 with magnets may be mounted in a cavity and self-align with mounting holes in the moving primary carriage housing. The coils 56 may then be placed into the stacks and the same housing 60 may be used as a mold for encapsulating the parts with epoxy. Because epoxy is not needed for structural support in the stacks, a more suitable non-structural epoxy or another material may be selected, for example, one which has better thermal conductivity, produces less "outgassing" and thus meets cleanroom requirements, or is better suited in a high vacuum operation.

Figure 30:
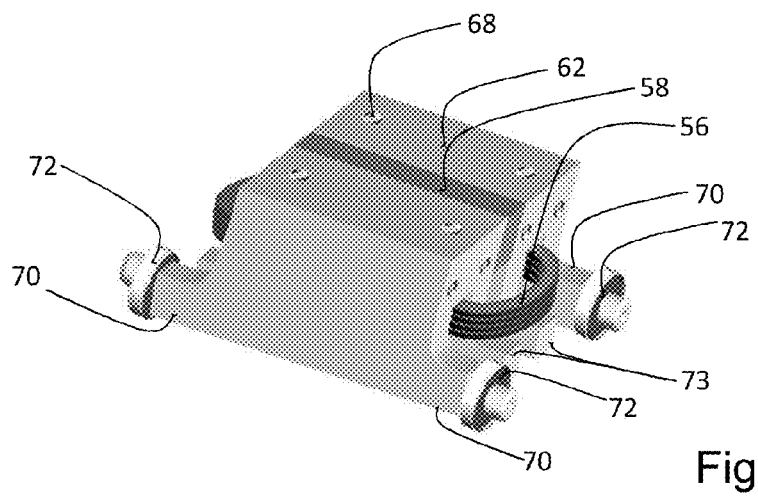
FIG. 30 shows a motor stack that may be used with a secondary comprising a sheet formed in the manner shown by any of the sets of figures above; and a bearing system therefor.
Figure 31:
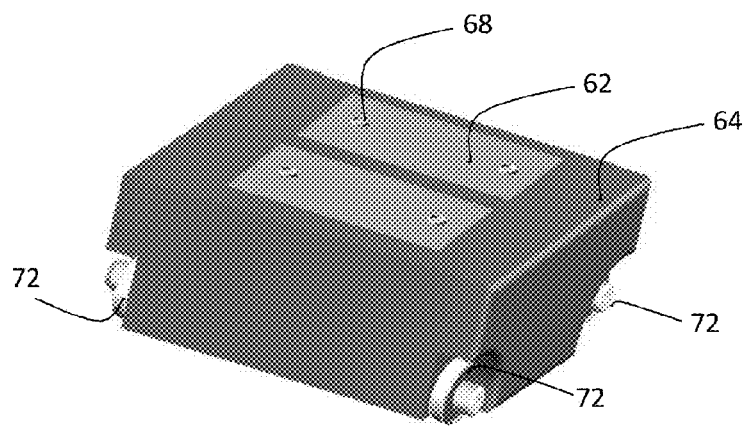
FIG. 31 shows the housingless motor of FIG. 30 with epoxy coating.

As an alternative, a stack 62 as shown in FIG. 30 may be encapsulated with epoxy 64 as shown in FIG. 31 to form the primary without a housing (i.e., housingless). The epoxy fills the teeth and covers the stacks 62 and coils 56 for electrical insulation, mechanical protection, aesthetic, or safety reasons. The customer may mount fixtures or tooling directly to the solid steel stack. External surfaces on the stacks may be configured with mounting holes 68 for mounting components as necessary based upon the end user application, including mounting a customer's payload directly to the stack. The stacks may also be configured to support the encoder and bearings. As shown in FIG. 30, the stack has projections 70 and roller bearings 72 may be directly mounted to the stack projections. The stack has additional projections and contours 73 to protect or hide end turns of the coils 56 under the motor teeth and reduce potential impingement from the bearings or alternately to provide greater tooth area which is oftentimes sacrificed in the design of some motors.

A linear encoder read head 74 (FIGS. 28,29) may be attached directly to the motor carriage. The linear encoder read head 74 is part of the linear encoder system that provides position feedback to the drive or controller of the motor. The linear encoder read head 74 reads an encoder scale provided on the secondary, as described below in greater detail, and eliminates the Hall Effect sensors that often are provided on the housing to establish motor commutation. The encoder read head may be disposed in a mounting pocket adjacent a stack. By machining the mounting pocket for the encoder read head along with mounting holes for the stacks together, a fixed relationship between the motor stacks 54 and encoder read head 74 may be accurately established and repeated during the manufacturing process. This fixes the "electrical or commutation angle offset" for the primary thereby facilitating set up and interchanging component parts.

The primary carriage 52 may also have an arrangement of bearings 80 that may comprise relative simple and inexpensive roller bearing assemblies (about 3 or 4) which can handle the high magnetic preloads between the primary and secondary. The roller bearings 80 may be configured for rolling contact with hardened wear surfaces of the support plate. The roller bearings 80 may be mounted to the housing 60 using conventional means and may replace expensive bearing blocks and precision machined spacers often found in some linear drive motors. The roller bearings 80 may be mounted into the housing shoulder screws with square nuts on the end of the screw which fit into slots on the housing to hold the bearing in place. Jack screws may be used to adjust the position of the shoulder screw in the slot to achieve the desired motor air gap. The bearings may be mounted to a solid steel stack in a similar way by machining a recess or pocket in the stack under the magnet to accommodate the square nut for sliding motion therein, and a shoulder screw may be used to mount the bearing. The bearing may also be mounted directly to the solid steel stack. Side guide bearings 82 may also be mounted to the housing (or stack) in a similar way. Holes 84 in the housing (or the stack) may be provided for access to the jack screws. A magnetic preload assembly 86 may be provided to hold the motor against the side of the platen. The magnetic preload assembly 86 may be formed from a permanent magnet disposed between two steel plates as shown in FIG. 28.

Additional embodiments of motor primaries are described below in greater detail and in reference to FIGS. 37-55.

Sheet Description

The linear drive motor stationary secondary 90 comprises a sheet 92 of a highly magnetic permeable material, preferably with a high iron content and low carbon content. The sheet may be fixed to a support structure 94 to form a platen segment for the secondary. The support structure 94 may comprise a relatively thicker plate with a pocket that receives the sheet, for instance, as shown in FIG. 28. The material forming the support structure 94 may be a high carbon steel or other hardened steel for strength and wear resistance while the sheet 92 insert is made from a relatively soft yet highly magnetically permeable material. The support structure 94 may have three precision ground and hardened bearing surfaces 96 which are typically two on the top surface and one guide surface on one side of the platen for the roller bearings 80 and side guide bearings 82 associated with the primary carriage. Thus, the support structure 94 may provide overall support for the platen segment, and bearing support for high magnetic preloads and customer loads, and guidance. A very thin hardened or tempered steel plate (not shown) may be disposed between the support base and the sheet to provide a wear resistant surface for the roller bearings to contact. The wear strip may be easily replaced when worn as necessary. Although the sheet is shown in the drawings as being insertable into a cavity 98 of a support structure to form a rigid and flat base for the secondary, the sheet may be mounted to a flat surface. The sheet 92 may be secured, or mounted to a support structure 94, with screws, spot welds, or adhesive.

Figure 35:
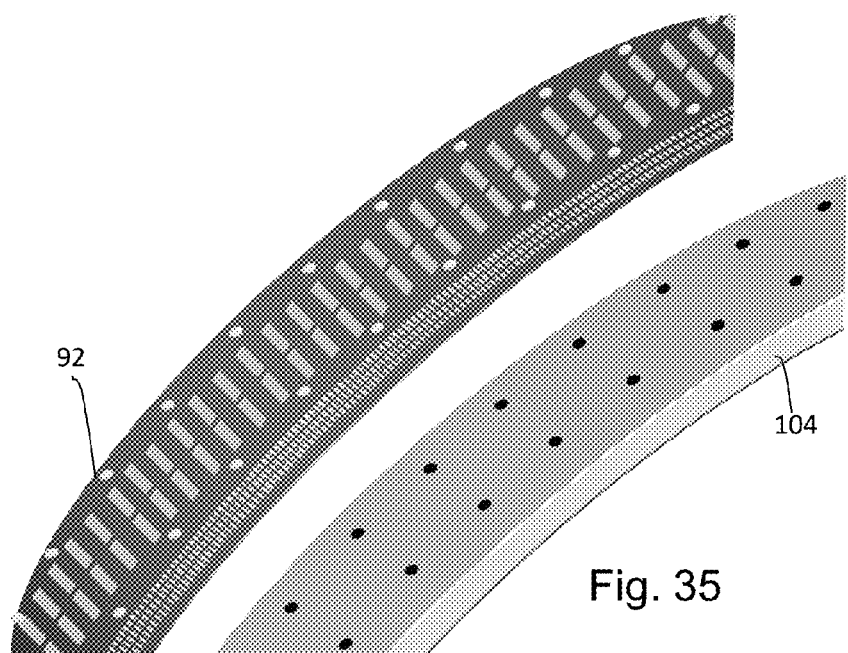
FIG. 35 is an exploded perspective view of an exemplary platen segment and curved support structure.
Figure 36:
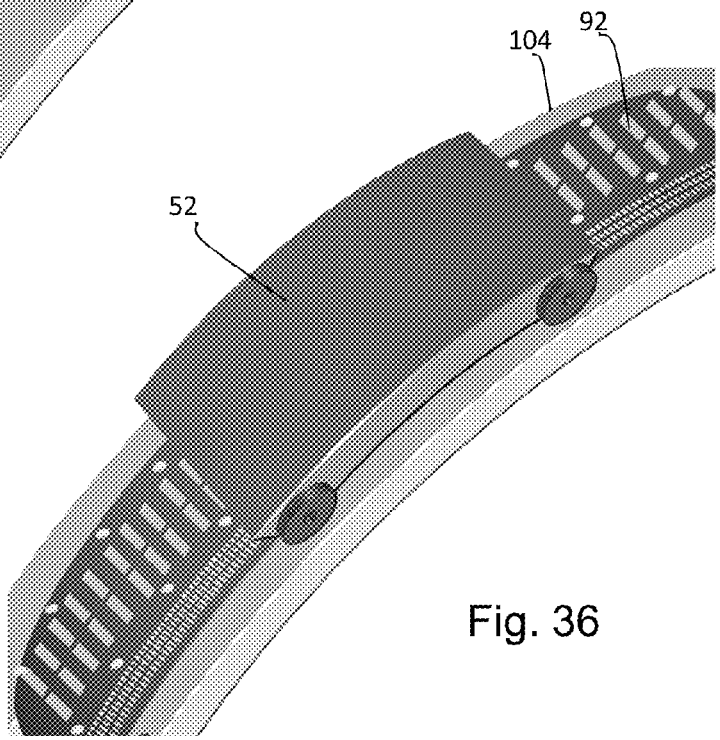
FIG. 36 is a perspective view of the platen segment and curved support structure of FIG. 35 assembled with an arcuate motor operatively coupled thereto for translation along the secondary.
Figure 37:
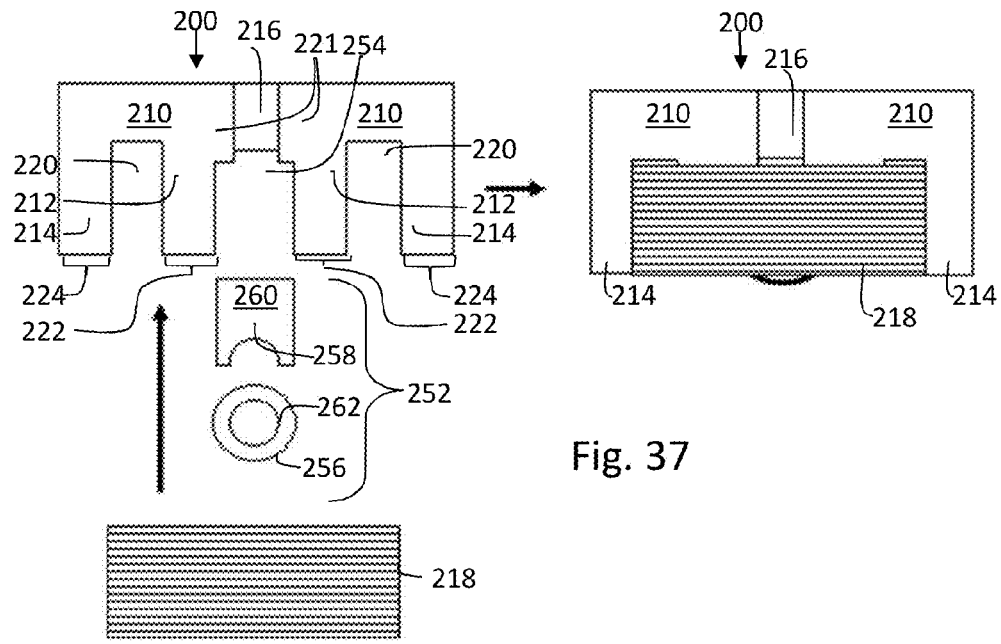
FIG. 37 is an exploded side view of one embodiment of a primary stage comprising a solid steel stack with an embedded roller bearing.
Figure 38:
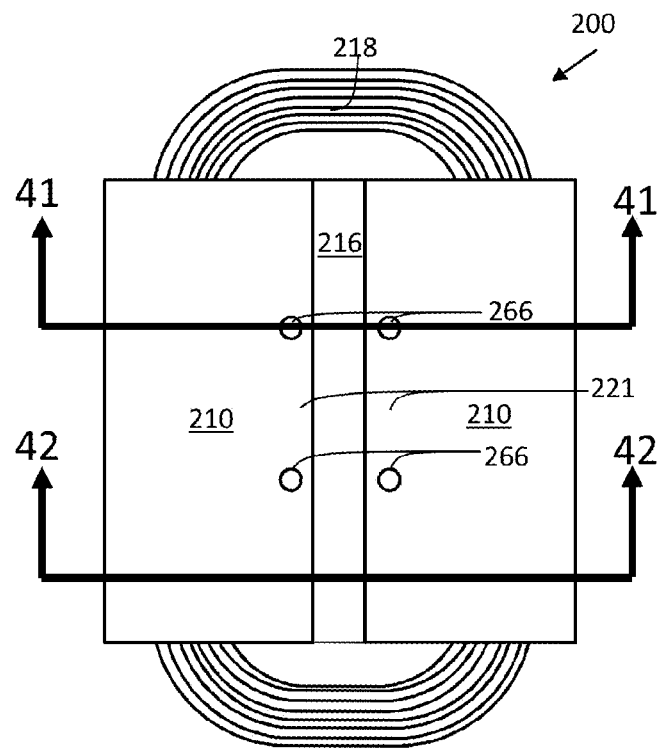
FIG. 38 is a top plan view of the primary stage of FIG. 37.
Figure 39:
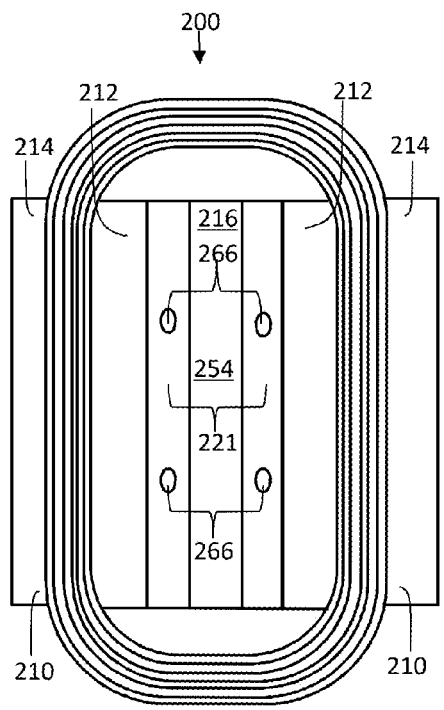
FIG. 39 is a bottom view of the primary stage of FIG. 37 with the embedded bearing assembly removed to show details of the recess formed in the stacks and magnet.
Figure 40:
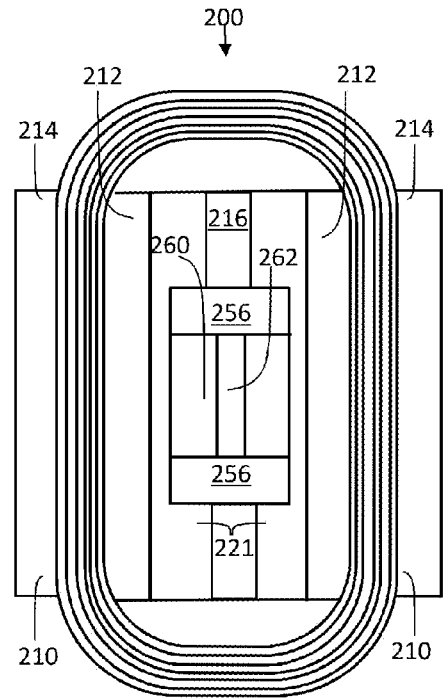
FIG. 40 is a bottom view of the primary stage of FIG. 37 with the embedded bearing assembly installed.
Figure 41:
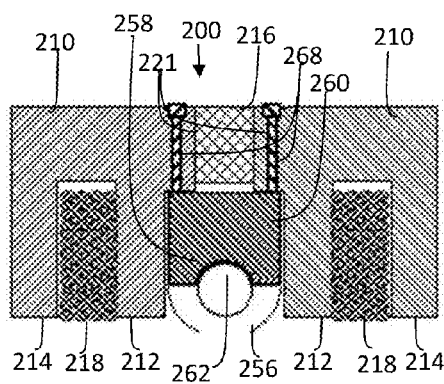
FIG. 41 is side cross-sectional view of the primary stage taken along lines 41-41 of FIG. 37.
Figure 42:
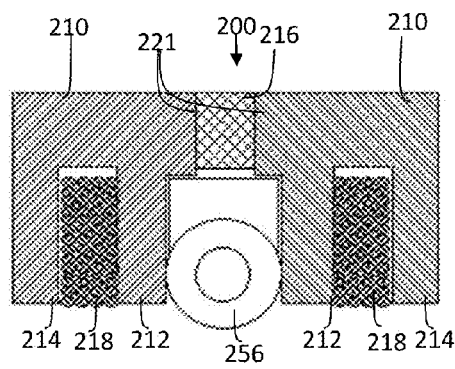
FIG. 42 is a side cross-sectional view of the primary stage taken along lines 42-42 of FIG. 37.

Additionally, a thin sheet 92 may be formed into a tube 102 as shown in FIGS. 32 and 34, or two sheets 92a may be wrapped into concentrically disposed tubes to form layers 102a to form a rotor of a rotary permanent magnet servo motor as shown in FIG. 33. Opposite side edges of the sheet may be attached together form the tubular shape. A thin sheet 92 may also be mounted to the curved support 104 and conform to the curved support as shown in FIGS. 35-36. Accordingly, the principles described herein may be used in connection with rotary servo motor and gear applications that require linear or rotary motion.

Referring to FIGS. 1-27, the sheet 92 preferably has a width 110 and a length 112, although both sides may be the same dimension, and a first surface 114 and an opposite second surface 116 with a thickness 118 extending therebetween. The sheet thickness may be 0.060 inches to 0.100 inches. A sheet may have a thickness of about 2 mm or (0.0787 inches). More highly magnetically permeable materials are readily available in these thinner thicknesses. The sheet 92 has a plurality of slots 120 in the first and second surfaces and at least partially extending through the sheet thickness parallel to the width 110 of the sheet and spaced along the length 112 of the sheet. The slots define a plurality of teeth 121 in the sheet between the slots and enable the sheet to be conformable to the mounting surface to which the sheet is mounted when forming the secondary of the motor. The slots/teeth may have a spacing defining a motor pitch.

Mounting holes 122 in the sheet may be added for mounting the sheet to the base. Guide holes 124 may be provided in the sheet depending upon the end user's application and requirement for external mounting of fixtures and tooling. The guide holes 124 (and/or mounting holes 122) may be synchronized with the features of the sheet described herein (i.e., "Track 3" for absolute positioning disclosed below) to establish a common "zero position" among motor secondaries. Additionally, after the sheet is mounted to a support structure or base plate, the guide holes 124 may provide references for customer use, for instance, precision drilled holes for reaming and installation of dowel pins or for tapped holes used in the end-user application.

Referring to FIGS. 1-26, the sheet may have a plurality of bridges 126 formed in the slots between the teeth thereby operatively connecting the teeth 121 together. This ensures the spacing of motor teeth 121 is relatively constant but yet allows the sheet to be handled in the manufacturing process without deforming the teeth and also to be conformable to the surface to which it is mounted. The bridges 126 between the motor teeth 121 assist in keeping the teeth in a proper spatial relationship when the sheet conforms to a curved support structure. The bridges 126 may form recesses in at least one of the first and second surfaces 114,116. Preferably, the bridges are about 25% of the sheet thickness, although the bridges may be the entire thickness of the sheet. The bridges 126 may also be generally flush with either of the first and second surfaces as may be desired. Making the bridges flush with the second surface reduces the effect of interference of the flux pattern between the primary and secondary caused by the bridges. Adjusting the thickness and the position of the bridge (i.e., flush or recessed from either the first of second side) allows the relative pliability of the sheet to be changed as desired.

As shown in FIGS. 11-25, the sheet may include laminations 92a stacked together to form the sheet. Each lamination may have a slot arrangement as described above so that when the laminations are stacked, they form a contiguous secondary. This allows the tooth height to be extended and the tooth cross section to be selected for optimum conditions. Thus, the laminations in the stack may be geometrically different and selectively stacked to form a desired cross sectional geometry of the teeth of the sheet. As an example in FIGS. 12, 17, and 22, the sheet comprises two laminations of about 2 mm (0.0787 inches) that are stacked to form a 4 mm thick sheet for the platen. Accordingly, the tooth height has been doubled which is desired when the motor pitch is doubled. This increases force with the larger tooth and produces greater velocities that may be developed in the motor, especially in a large pitch motor. For larger pitch motors, laminations may be stacked as desired to provide a desired tooth size. When stacking multiple laminations, the bridges may be formed narrower to reduce interference with the magnetic path between the motor and secondary teeth. By way of illustration and not in any limiting sense, the secondaries shown in FIGS. 11, 16, and 21 have a 10 mm motor tooth pitch.

The slots in the sheet may be formed in such a way that the motor teeth have a cross section other than rectilinear. For instance, it has been found that a trapezoidal tooth has advantageous magnetic properties in a linear motor to produce more force. Accordingly, the width of the slot 120 on the top side 114 of the sheet may be greater than the slot width at the bottom side 116 of the sheet. FIGS. 5, 10, 15, 20, and 25 show such an arrangement. Each of the laminations may be formed accordingly so that when they are stacked to form the sheet, the desired shape is achieved. FIGS. 15, 20, and 25 show such an arrangement where each of the laminations of the sheet has teeth with a cross section such that when stacked to form the sheet, the teeth have a composite trapezoidal cross-section. Other geometries are also possible. For instance, a lamination may be formed with teeth or surface features on the inner layer as shown in FIG. 33 having an aerodynamic shape to act like a cooling fan to draw air directly through the motor.

Adjacent the motor teeth 121, a plurality of pockets or recesses may be provided in the top surface of the sheet to form one or more sensors for drive components of the motor. The pockets or recesses may be formed as teeth, for instance, for an encoder and/or for a sensor generating commutation signals for the drive of the motor. The pockets or recesses may also be formed to hold magnets or other devices used in sensors for positioning functions associated with the drive of the motor. It is not necessary that each sheet have encoder teeth or commutation teeth or pockets comprising sensors for positioning or for identifying platen segments. A sheet as described herein may include any one or number of features depending upon the application. Preferably, the pocket or recesses are formed in the same manufacturing set-up to reduce variation. The top surface plurality of pockets and recesses may be formed adjacent the plurality of slots forming the motor, and extend parallel to the width of the sheet and spaced along the length of the sheet.

Preferably, the slots in the sheet (or the individual laminations) comprising the motor teeth, and the plurality of pockets and recesses comprising the teeth and pockets used for the encoder, commutation, and/or positioning functions, are formed through a photo-chemical etching process. The pockets, for instance, forming the encoder track and/or the commutation track, may be formed by a "partial one sided etching" or "step or blind hole etching". This process has proven satisfactory for creating small precise features. As an example, the encoder and commutation track have teeth that are etched to a depth of approximately 0.25 mm. Preferably, each sheet forming a platen segment may have its features dimensionally identical to another sheet, so that when multiple platen segments are arranged together, each platen segment will have the same electrical or commutation angle offset thereby facilitating set-up and interchanging component parts.

For forming the slots in the sheet (or the individual laminations) comprising the motor teeth, "a single sided through etch" or "double sided through etching" may be employed to create the slots in the laminations, although a "double sided through etch" process is preferred. When photo chemical etching is from only one side there are inherent limits to the size, depth, shape and quality of the features. The "double sided etch" process etches the same feature in both sides of the sheet (or lamination) at the same time. Double sided etching minimizes problems from "over-etching," creates more accurate and more repeatable features, and allows different patterns to be etched on each side of the sheet (or lamination). For instance, "double sided etching" allows forming a tooth that is wider on the bottom than on the top. The effect is to create a "trapezoidal" shaped tooth which has better magnetic flux properties. For instance, in a trapezoidal tooth shape, the tooth bottom is larger which allows for improved overall flux flow and the top of the tooth is optimized for the motor primary or for properly saturating of the tooth surface. A two sided photochemical etching process facilitates this process where one slot can be made larger than the other leaving an approximate trapezoidal tooth shape. As discussed above, this results in motor teeth that are narrower on the top side 114 of the sheet and wider on the bottom side 116 of the sheet. Preferably, a combination of "partial one sided etching" and "double sided etching" is used to form the slots/teeth in the sheet and the encoder track, commutation track and/or other tracks and features in one step-up, thereby allowing the etched pockets and recesses to align to the motor teeth as necessary to allow an accurate and repeatable system. Proper implementation of the commutation track and other tracks as described herein requires that the relationship between features and the motor teeth be very repeatable over each pole pitch. Thus, a "combination etch" combines the "double etch" process, which forms large motor teeth, with a "partial etching" process, which forms the smaller critical features, i.e., pockets for the encoder and other sensor functions. The "combination etch" lowers the cost to manufacture the secondary and synchronizes the motor teeth with the encoder and other sensor pockets. The recessed bridge features may also be formed through a "combination etch" process where the slots forming the motor teeth are etched from the top and bottom while the areas on either side of the bridges are etched from the bottom. Other methods of forming the sheet with the features described herein may also be used, including EDM or conventional machining.

Encoder Track

As shown in the drawings, a first plurality of pockets 130 is formed in a line adjacent the motor teeth. These pockets may comprise an encoder scale for the motor. Tying the spacing of the motor teeth to the encoder locks or synchronizes the motor pitch to the encoder pitch. Preferably, the encoder pitch is an integer multiple of the motor pitch. This allows for accurate sinusoidal motor commutation, as explained below, which inherently maintains optimum commutation during the course of motor travel across the secondary. As an example, as shown in FIGS. 1 and 26, the sheet has motor teeth arranged with a 5 mm or 10 mm pitch and pockets for providing an encoder scale arranged with a 1 mm pitch.

The encoder system which includes the read head 74 and teeth 130 may comprise an incremental linear encoder that generates a transistor-transistor logic ("TTL") output signal in the form of a series of pulses relative to the amount of movement. The incremental linear encoder read head 74 reads the series of teeth 130 on the sheet and creates a series of pulses which the drive interprets as fixed increments of distance. The encoder is typically an inductive or capacitive encoder and may also provide output in the form of sine/cosine information. The encoder system may comprise an incremental encoder with reference pulses and magnetic sensors.

Preferably, the pockets 130 forming the encoder scale are etched relatively near to the motor secondary teeth. The pocket width and overall pocket pitch are preferably made to match the encoder being used. The encoder pole pitch will typically be about ½ mm to 3 mm, though the pitch may vary as required in an application to provide the needed speed for the motor, resolution, or encoder air gap. The typical resolutions of the encoder ranges from ¼ micron to 1 micron. The pocket depth for each of the encoder teeth may be approximately 0.25 mm. This depth has been found satisfactory as it allows for implementation of the "partial" photo-chemical etching processes that will create accurate features without degradation. An encoder scale formed in this manner is resistant to mechanical damage and the magnetic fields from the motor and from the magnets in the secondary, and impervious to dirt, oil, and other environmental contaminates.

Commutation Track

In addition to, or in the alternative, a plurality of pockets or recesses 140 on the sheet may also form a sensor operatively connected to the drive of the motor to facilitate commutation of the motor. For instance, the pockets forming the sensor for the commutation function of the drive may be formed in a distinct track(s) in the top surface of the sheet adjacent to or alongside the pockets forming the sensor for the encoder. The sensor may read the teeth in the track and control commutation of the motor. Thus, the commutation functionality may be provided without using Hall Effect sensors or performing a "phase search." Preferably, the pockets used for the commutation function form teeth having a width equivalent to the width of the teeth of the encoder track. As shown in the drawings, the encoder track 130 and a commutation track 140 are in close proximity to each other. Generally speaking, the spacing of pockets or teeth 140 used for the sensor for commutation is the same as the motor teeth 121, i.e. the same pitch. The pitch of the teeth of the commutation track is preferably at least the same as the teeth of the motor secondary but could be less. Additionally, the pitch of the teeth 130 of the encoder scale are an integer multiple of the pitch of the teeth 121 of the motor secondary pitch. Thus, each motor tooth will align with an encoder tooth and a commutation track tooth in a repeating pattern all along the length of the sheet of the platen segment. For ease of discussion, the tooth in the commutation track that aligns with the motor tooth will be referred to herein as a "primary commutation" tooth or pulse 142. The commutation track may be formed with an addition tooth between the primary commutation teeth. For ease of discussion, the additional tooth will be referred to herein as a "secondary commutation" teeth or pulses 144. The commutation track may be formed with additional teeth adjacent the primary commutation teeth. For ease of discussion, these will be referred to herein as "marker" teeth or pulses 146.

The commutation pulses 142,144, which may include primary pulses only, or primary and secondary pulses, depending upon the application, allow the motor to move only to the next commutation pocket or position to establish motor commutation. Because the commutation pulses 142,144 are synchronized with the motor secondary teeth 121, the motor drive is able to locate a commutation pulse in a distance less than or equal to the motor tooth pitch, thereby enabling the motor drive to determine motor phasing. Because the commutation pulse is aligned with the motor tooth, the drive may readily determine its relative location. Because both teeth are precisely formed, for instance, through the photochemical etching processes discussed above, the motor and commutation tooth are precisely aligned, and quick and precise commutation occurs without variations. This eliminates the need of Hall Effect sensors when used on linear synchronous motors with magnets in the secondary, or the need of "phase searching" to establish commutation for other linear synchronous motors that do not have magnets in the platen but have teeth instead.

Hall Effect sensors increase motor costs, for instance, additional cabling and sensors, and increase operational requirements, for instance, run time when establishing commutation.

Linear drive motors with Hall Effect sensors may be difficult to align or position in the motor primary, and may degrade commutation in a motor if excessive variation exists in placement of the Hall Effect sensors on the primary and their associated magnets on the secondary. Providing an encoder and commutation track that are synchronized optimally with the motor secondary teeth eliminates these drawbacks.

As an alternative to Hall Effect sensors, "phase searching" may be used but may produce unpredictable results. Phase searching may be accomplished by powering a coil and aligning the coil to a tooth or a magnet. However, this method sometimes produces poor results due to "cogging" in an "iron core" motor or any motor with a predominately iron-based primary or when a load is pulling against the motor, for instance, from a cable track or a heavy load. Particularly, in vertical applications, it is usually difficult to perform phase searching due to the gravitational loads. Providing an encoder and commutation track that are synchronized eliminates these drawbacks.

Because the commutation pulse is synchronized with the encoder track pulses which are in turn synchronized with the motor teeth, predictable and repeatable commutation is achieved. In essence, a repeating zero point is created at every motor tooth because all three essential components, namely, the motor teeth, the encoder teeth, and the commutation teeth, are realigned or set to zero at every motor pole pitch. This assures correct sinusoidal commutation alignment regardless of the distance of the relative motion between the primary and the secondary, or as discussed below in greater detail, regardless of whether the move involves traversing several sheets of platen segments. In other words, after commutation is established, the drive need only apply the motor electrical or commutation angle offset through the encoder track to any platen secondary. Because the encoder track teeth, motor teeth, and commutation track teeth are synchronized, variation is eliminated, particularly in motors with smaller tooth pitches having relatively lengthy travel-distance requirements.

When dimensional variation of the features of the sheets forming the platen segments is significantly reduced through the manufacturing process, for instance, the photo-chemical etching processes disclosed, a primary may be replaced with another similar primary and/or a secondary may be replaced with another similar secondary. This reduces issues often associated with a relatively lengthy secondary of a sinusoidal commutated motor where manufacturing variations associated with the locations of teeth or magnets stacks up and causes an error to accumulate with respect to the expected phase positions in the drive that are tied to the encoder scale, and the actual phase positions in the secondary. The effect of this error is multiplied with motors having reduced motor pitch as the drive applies phase currents at less than precise positions or in a less-than-optimum manner. Because the encoder and motor secondary teeth are linked in an accurate and repeating pattern, the drive is less likely to lose commutation, and there is less variation during long distances of travel or with locations associated with small pitch motors. Furthermore, secondaries may be moved and interchanged indiscriminately between any number of fixed primaries as disclosed below without having to slow down or stop to "establish commutation." There are at least two aspects disclosed here: (i) sinusoidal commutation varies little if at all in any condition, and (ii) once a primary has "established" commutation in a platen in plurality of like platens, it does not need to "re-establish" commutation in another platen.

In the exemplary sheets shown in FIGS. 6-10, 16-20, and 21-26, the motor moves at most 5 mm and receives a commutation pulse with the motor commutation and electrical or commutation angle offset stored in the drive. In the sheets of FIGS. 21 and 26, the primary commutation pulses 142 correspond to the first tooth in a grouping or series of marker pulses 146 (either 2 to 4 teeth which are shown in the drawing with "II," "III," or "IIII"), and the secondary commutation pulse is alone (i.e., not in a group or series), and is read by the drive as a commutation pulse. In sheet of FIGS. 21 and 26, the additional secondary commutation pulses 144 allow the drive to read a commutation pulse within movement of the motor primary of only 5 mm rather than the 10 mm distance between primary commutation pulses. As explained below in greater detail, the primary and secondary commutation pulses 142, 144 may also be used to identify position on the sheet comprising the platen and information about the sheet. A primary and secondary commutation pulse is not required on platens having a relative short length to read a pulse. The sheets of FIGS. 6-10 and 16-20 do not show secondary commutation pulses.

In a different application involving cog-free, iron core or permanent magnet motors, the teeth of the commutation track 140 may be aligned with magnet slots/pockets 148 of the secondary (rather than aligning the teeth of the commutation track with slots or pockets defining the motor teeth as described above) (FIG. 27). In addition, the magnet slots/pockets 148 may be aligned with a primary commutation tooth 142 and a secondary commutation tooth 144 may be added between adjacent primary commutation teeth to establish commutation in a distance corresponding to half of a pole pitch (FIG. 27). On motors with magnets in the secondary, as shown in FIG. 27, a pole pitch is made up of two magnets. In FIG. 27, the pole pitch is 50 mm and 5 distinct pulses 146 between the poles are added to allow phase searching to be accomplished within a fifth of the pole pitch or 10 mm. Thus, the required distance of movement for commutation is 10 mm. Additional pulses may be added as needed as pole pitch increases and/or to minimize the distance the motor primary needs to move to read a commutation pulse. In a cog-free motor application as shown in FIG. 27, the magnets may extend through the slots 148 in the sheet, or be disposed in pockets in the sheet.

Track 3

In addition to the encoder track and/or the commutation track, the top surface of the sheet may have additional tracks 150. As will be described in additional detail below, another plurality of pockets formed on the top surface of the sheet may be used to form a sensor operatively connected to the drive of the motor for position functionality associated with the motor. As described hereinafter, "Track 3" maybe used to provide this functionality. The plurality of pockets 150 forming Track 3 may be formed as teeth at a similar depth as the commutation and encoder tracks, and used to form a sensor operatively connected to the drive of the motor for providing "absolute position" information about a sheet or platen segment. As discussed below, when Track 3 is synchronized with Track 4 and a plurality of like sheets of the platens are arranged end-to-end in an elongated track, "absolute positional" information may be generated for all of the platen segments.

Track 3 may function as a flexible pseudo-absolute encoding system. The plurality of pockets or teeth 150 of Track 3 may have a pattern that is different from the other tracks but repeats at a different interval, for instance, using the example above shown in FIG. 26, every 10 mm along with the pattern in the commutation track. The sensor(s) associated with the drive may be configured or enabled to interpret the pulses generated by the teeth of the commutation track and the teeth of Track 3 as a "packet" of information that provides absolute positioning information within single sheet. For purposes of illustration and not in any limiting sense, the pulses generated by the teeth 140 of the commutation track may be referred to as "index pulses." The drive system may be configured to look at the index pulses from the commutation track and determine the location on the sheet of the platen. For instance, as shown in FIG. 26, 10 bits of unique information may be collected in a "packet" between the commutation and the encoder tracks since there are 10 pulses in Track 3 between the "primary commutation pulses", and from that absolute position may be established. The packet of information may correlate to a value found in the look-up table or the value, or be determined from a look-up table or other algorithm tied to a distinct commutation pulse correlated to that packet of information.

In the example shown in FIG. 26, the teeth 150 of Track 3 correlate with the teeth 140 of the commutation track and the encoder teeth 130, where there is a 5 mm motor tooth pitch, a 5 mm commutation tooth pitch, and a 1 mm encoder scale pitch. The 10 mm repeating sub-segments in the commutation track are defined by the first pocket or the "primary commutation pulse." In the drawings, the primary commutation pulse always has another index pulse (i.e., marker tooth or teeth 146) associated with it. There may be 1, 2, or 3 teeth next to the primary commutation pulse to provide the index pulse. This creates a larger repeating pattern in Track 3 and enables creating more pulses for development of a large skew or a 10 bit digital word.

In this way, the number of marker teeth 146 next to the primary commutation pulse 142 may be used to identify a location within a single sheet. For instance, one pocket next to the primary commutation pulse segment indicates the position is in the first third of the sheet. Two pockets next to the primary commutation pulse indicate a position in the middle third of the sheet. Three pockets next to the primary commutation pulse indicate a position in the last third of the sheet. The use of marker teeth or pulse after the primary commutation pulse adds a multiplying factor of three to the "packet" of information collected by the sensors associated with the Track 3. This also reduces the distance the motor primary moves to find absolute position when many sheets are strung together. As discussed above, the commutation pulse between the primary commutation pulses is the secondary commutation pulse. Unlike the primary commutation pulses, the secondary commutation pulse 144 preferably does not have a marker pulse associated with it. Thus, the secondary commutation pulse 144 is easy to identify in the commutation track and is used for commutation only, and not for identifying the repeating pattern in Track 3. The secondary commutation pulse may be eliminated if moving the motor primary a greater distance to establish commutation is not an issue in the application.

The 10 bits of information found in Track 3 allows for encoding of a sheet of a platen segment. As an example, a sheet forming a platen segment having a length of 2500 mm would be sub-divided every 10 mm into 250 sub-segments each with its own reference encoding in the manner described above. Thus, the motor may find absolute position by moving no more than two primary commutation pulses. Using the example describe above, the motor may move less than 5 mm to read the presence of a commutation pulse in Track 2. For instance, if the drive reads a primary commutation pulse, the drive will first establish commutation and continue to move until it reads at most 10 bits of information in Track 3, thereby enabling the drive to identify its exact location on the sheet. If the drive reads a secondary commutation pulse first, the drive will establish commutation, advance to the primary commutation pulse, and then read the 10 bits of information in Track 3, thereby enabling the drive to identify its exact location on the sheet. Because the information in Track 3 is synchronized or tied to the commutation pulses of Track 2, the drive is able to distinguish between and precisely locate positions for 250 or more unique "home" locations in a single platen segment. These "index pulses" establish quick and accurate motor commutation and absolute position within a platen segment. Because the commutation pulses in fact function as homing or index pulses within the encoder, the motor's position is very accurate and repeatable to 1 encoder count. Therefore, the information from Track 3 applied to a commutation pulse will be accurate and repeatable to 1 encoder count.

Only 7 bits of the 10 bits of information in Track 3 are needed to give absolute position in a 2500 mm long sheet. Utilizing all 10 bits would allow encoding a 30,720 mm platen. Thus, a flexible pseudo-absolute encoding system may be used for: (i) minimizing search distance to establish absolute position; and/or (ii) maximizing the possible platen length through a plurality of segments. For example, in a motor having a fixed primary and moving secondaries having a length of approximately 24 inches (610 mm), a 5 mm pitch motor without secondary commutation pulses is able to find commutation and absolute position in only 5 mm of travel. The platen may be divided into 4 zones by adding 1, 2 or 3 pulses after the primary commutation pulses in the commutation track (Track 2) (see FIG. 26). Track 3 of such a motor may have 5 bits of information and with the 5 mm motor pitch, the motor may be provided with 640 mm of encoding.

A skew may also be incorporated into Track 3 to provide an alternate means of determining absolute position on a sheet of the platen. Accordingly, the "packet" is not 10 bits of information but a skew. There may be a unique skew between each primary commutation pulse or "home" index pulse. Depending upon the application, adding 1, 2, or 3 pockets after the primary commutation pulse, as described above, may not be necessary. One pocket after the primary commutation pulse may be used to establish position markers in the sheet as shown in FIGS. 21 and 27. Alternately, the secondary pulse may be eliminated if a longer distance to establish commutation is acceptable in the application. This may be useful to minimize the programming in the drive.

Track 4

In addition to the encoder track and/or the commutation track and/or Track 3, the top surface of the sheet may have additional tracks. As will be described in additional detail below, another plurality of pockets formed on the top surface of the sheet may be used to form a flexibly programmed sensor operatively connected to the drive of the motor. The teeth may be formed in a track. As described hereinafter, "Track 4" 160 maybe used to provide "homes" and/or positional limit information, and/or platen segments identification.

Magnetic material may be added later into the pockets 160 of Track 4 to form the sensor for setting positional limits. These additional pockets may be etched alongside or adjacent to the encoder scale to a depth that makes the magnets approximately flush to the encoder scale or as needed to be optimally read by the encoder head. Index pulses from the commutation track, may be used in connection with the magnetic signals from the positional limits to provide precise and accurate positional limits for the motor. In general, a magnetic limit may not be very accurate or repeatable because of inherent hysteresis. However, the effects from hysteresis may be eliminated when the magnet positional limit is used in connection with index pulses from one or both of the commutation track and/or encoder track. For instance, a pocket forming a sensor for a positional limit may comprise a "south" magnet, and when the drive receives the signal generated by the "south" magnet, it will assign a position to the motor primary to that of the nearest commutation index pulse read by the encoder, thereby establishing an accurate to "home" for the primary. Accordingly, the commutation pulse is in essence a "home" index pulse. Thus, the combination of the magnet and the index pulse provides an accurate and repeatable "latch" for homing which is accurate and repeatable to 1 encoder count. Also, a "north" magnet may be added to Track 4. The drive may be configured to read the "north" magnet as a limit, as needed by the application. If a home is not needed, for instance, when the scale is configured as a pseudo absolute encoder for a single secondary, as stated above, the "north" and "south" magnets can be simply read as left and right limits.

Alternately, the pockets with magnets or other markers in Track 4 may also be used to identify a platen among many platens. Because the drive may determine the absolute position information for the platen segment from the information from Track 3, the drive may determine where every magnet pocket is located with respect to every primary commutation pulse and be configured to determine the patterns of the magnets to determine a platen segment's identity. Number codes may be etched into the platen segment to assist in identifying a platen segment from among many. This allows for flexible programming. As shown above, the information contained in Tracks 2 and 3 establish both commutation and absolute position within a single platen segment. A pattern of magnets at the beginning of a platen segment in Track 4 may also be used to identify platens. For instance, "north" magnets may be used to identify a platen, thereby allowing "south" magnets to be used as limits. As an alternative, "north" and "south" magnets may be used to identify platen segments. As yet another alternative, where more platens are seamed together, a skew may be used in placement of magnets. By way of example, Track 4 may be formed with 200 to 500 magnet pockets in one 2500 mm platen segment, and by placing a magnet in a different pocket among the 200 to 500 available magnet pockets in Track 4 of the platen, one magnet could be used to identify some 200 to 500 platen segments. By using "north" and/or "south" magnets, 400 to 1000 platen segments may be identified. If more platens need to be identified multiple magnets may be used. Magnets may also be added between every primary commutation pulse to reduce the length of travel during identification of a platen from the length of the platen segment to only 10 mm in the examples described above. Magnets may be placed in a repeating pattern in any multiple of the repeating 10 mm pattern between primary commutation pulses. Additionally, different combinations of "north" and "south" magnets may be used to identify the platens. The information within a pattern may be read as a skew or as a digital word. The word could be in a "binary" format with two conditions reading a "north" or "south" magnet providing a "bit" of information. The word could also be in a base 3 format so within a single pocket in Track 4, there can be three conditions, for instance, a north magnet is read as "+1", no magnet in a pocket is read as "0" and a south magnet as "−1". Accordingly, the drive may be configured to read the "packets" of information from the magnets in Track 4, and access a look-up table to identify the platen segment. Providing Track 4 in a digital word format may be preferred when configuring platen segments as moving secondaries to be passed between fixed primaries. In such an arrangement, the drive may be configured to read the first 10 pockets, which may include magnets or spaces, and from information identify the platen. In a base-2 system, 1024 platen segments may be identified; in a base-3 system, 59049 platen segments may be identified.

Using the principles described herein, the drive of the motor may be configured to operate in an "open loop" mode until it reads any commutation pulse in Track 2 whereupon commutation is established, and thereafter, the drive may be configured to operate in a "closed loop" or "servo mode". Elaborating on the example provided previously, the drive may also be configured such that when it reads a primary commutation pulse 142, it establishes commutation, and determines absolute position in the platen segment based upon the combination of the primary commutation pulse of Track 2 and the 10 bits of information read from Track 3 between primary commutation pulses. The drive may also be configured such that when it reads a secondary commutation pulse 144 before the primary commutation pulse, the drive establishes commutation at the secondary commutation pulse, advances to the next primary pulse, and determines absolute position in the platen segment based upon the combination of the primary commutation pulse of Track 2 and the 10 bits of information read from Track 3. The drive may then be configured to move the motor in such a way that the drive reads the information of Track 4 and then determines platen identity, for instance, by grouping the Track 4 information into the appropriate packets defined by the repeating pattern of markers on Track 4, and/or by comparing the information with an algorithm or look-up table. In other words, the drive is configured to determine absolute position on a single platen based upon the combination of commutation pulses of Track 2 and the information of Track 3. Once absolute position on a single platen is determined, the drive may be enabled to read information encoded in Track 4, for instance, read and interpret any combination of magnets and/or spaces present in Track 4. Thus, through the combination of commutation pulses of Track 2, positional information from Track 3, and the arrangement of markers in Track 4, determine platen identity, home positions or limits. Accordingly, the positional or identification information developed from the combination of the commutation pulses of Track 2 and the information of Track 3 and/or Track 4 will be accurate and repeatable to 1 encoder count.

The description above utilizes a sensor comprising magnets installed in the pocket. However, the sensor may use labels read with an optical scanner. The pockets 160 may be etched with the label or in a manner to locate the label instead of the magnets as described above. For example, the instructions may provide programming for the drive to move the motor through a sequence of moves. In this way the platen may be used in CNC machining center, and the instructions encoded in Track 4, may enable the system to move the platen to a position for a machining operation (i.e., "go to a point and wait for a hole to be drilled") and then advance to the next step. Another application may involve a conveyor line used to feed, position, sort, and/or transfer randomly "moving secondaries" in a non-sequential manner from a fixed primary to a conveyor and then to another fixed primary capable of rotation to allow transfer of the secondary to other conveyor lines. Because the electrical or commutation angle offset may be set for specific motors, there is interchangeability between primaries, secondaries and drives for a given motor, and the ability to pass identical secondaries from one primary to another. The systems and methods described herein may also be used in systems in a warehouse or factory with lengthy runs of conveyor or rail system. In one example, a warehouse may use several sheets forming platen segments that are installed in a floor of the warehouse. Also, multiple "robots"

may be used on the different sheets of the platen segments, the positional limits and "home" of each sheet may be established so that the robots do not interfere with each other.

A linear stage as described herein is highly integrated and merges (i) key motor secondary components, such as motor teeth, encoder teeth, commutation tracks, absolute position tracks, limits and home positions; (ii) a bearing rail system; and (iii) key motor primary components, such as motor teeth, coils, encoder; all in close proximity to each other and in many cases in a functional interrelationship.

Additional Primary Stage Embodiments

A primary stage may have additional features. These features may include: (i) a bilaterally symmetric three-point roller bearing placement system on the primary stage; (ii) solid steel stacks; and (iii) an extruded housing, all of which combine to allow for a highly integrated and compact design for the primary. When combined with the integrated motor secondary platen described above, the two create a compact and highly integrated stage. Each feature has advantages. For instance, the bearing system described herein lowers bearing material requirements and minimizes deflections in a thin motor secondary. The features of the platen described in the parent applications allows for the reduction of housing and bearing requirements by integrating the motor secondary, the encoder scale, and the top and side bearings rails. The bearing system may comprise a three-point bearing system on a housing shown in FIGS. 28-29 and 44-47. A bearing system may also be installed directly on the stack as shown in FIGS. 30-31 or embedded in a solid steel stack as shown in FIGS. 37-43. Solid steel stacks provide structural strength for such a bearing system. A solid steel stack may be provided with mounting attachments for bearings. The bearings may be mounted to projections extending from the stack or embedded within recesses in the primary stage or stack. Solid steel stacks also allow the machining of contours and other features that provide an improved stack configuration for a primary of a linear drive motor. A solid steel stack may be provided with contouring around the stack to support and to protect the windings of the stack. A solid steel stack may be provided with cooling passages for the liquids and to provide cooling as needed, for instance, in high vacuum applications or other applications involving high speeds, high torques, high motor duty cycles, and/or other applications where the primary develops excessive heat. A solid steel stack may also use a gas bearing as shown in co-owned U.S. Pat. No. 7,566,997, the disclosure of which is incorporated by reference herein. A solid steel stack will not degrade under high vacuum and therefore is advantageous to a stack comprising laminations that may delaminate over time in such an application. A solid steel stack need not have any specific epoxy requirements. Accordingly, a solid steel stack may be potted with an epoxy that is specific for the application, i.e., a highly corrosive or an environment where outgassing is a concern. A solid steel stack may also be potted with epoxy that is appropriate for clean room application, for example. Alternatively, a solid steel stack does not need be potted with epoxy because it is not needed for support in the stack. A solid steel stack may be used in a stand-alone configuration, i.e., housingless as shown in FIGS. 30-31 and 37-44.

The stack may also be used in a housing as shown in FIGS. 28-29 and 45-55. An extruded housing allows for a platform that with conventional machining techniques provides mounting surfaces and alignment of all the critical components, main roller bearings, stack assemblies, a multifunction encoder, a side rail guidance system, a magnetic preload assembly, and EMI cavities for power and encoder cable connections. An extruded housing allows for the creation of multiple mounting surfaces for critical components, allows for the critical components to be mounted via conventional means, i.e., bolt-on, snap-in, and allows for the critical components to self-align with each other in the housing in such a way that the entire primary mates accurately with the various critical surfaces on the platen secondary, such as those discussed in the parent application, including the two main bearing surfaces, the side guidance bearing surface, the encoder scale, the secondary motor teeth, the limits, and homes.

The parent applications described a motor secondary which has a set or synchronized relationship between the platen and encoder teeth which in turn sets the electrical angle for all secondaries. The disclosure which follows describes synchronizing components of a primary to fix the electrical angle in the motor primary though precise control and placement of the stack assemblies and the encoder read head. A stack and housing may have its critical features machined in one setup to reduce variation, and thus, the electrical angle of the primary may be set for a given motor type, thereby allowing interchangeability of various critical components of the linear stage and the use of multiple moving secondaries over a single primary and/or multiple primaries over a single secondary, as well as combinations thereof. This is particularly advantageous in applications where a plurality of moving secondaries are passed over a stationary primary, and the problems of having to re-commutate for each secondary are eliminated as described in the parent application. For instance, in the housing, locators for the encoder read head may be formed in the same setup as stack locators, thereby allowing a greater repeatability and accuracy during the manufacturing process. Because the electrical angle for all primaries and secondaries are the same, various critical components of the linear stage may be interchanged without having to modify the drive settings, thereby making it very easy for an end-user to install, repair or replace a motor primary, secondary or drive, and sub components such as the main or side bearings or encoder heads, etc.

A solid steel stack as described herein may be formed from a low carbon steel, which has been annealed to enhance magnetic properties. Annealing promotes magnetic permeability and lowers wattage loss due to microstructural change and helps by relieving internal stresses. The steel stack may be annealed in a regular atmosphere without concerning about surface oxidation. Because the stack is machined after annealing to a depth larger than the thickness of oxide layer, annealing may take place in a regular atmosphere without concern about surface oxidation.

Eddy current losses may also be reduced by increasing the pole pitch of the primary stage. Increasing the pole pitch reduces the frequency produced in the coils and thus eddy current losses which are related to the number of coils and the frequency passing through the coils. While increasing the pole pitch can substantially reduce eddy current losses, increasing pole pitch tends to increase cogging in the motor. Any negative effects from cogging may be substantially reduced by shifting two teeth with the stack assembly to be misaligned or skewed with respect to the corresponding platen teeth. Unaligning of the teeth within a stack assembly of the primary is disclosed in U.S. Pat. No. 7,230,355, the disclosure of which is incorporated by reference herein. An integrated stage using an extruded housing and solid steel stack with unaligned teeth, assists in diminishing motor cogging. By selectively changing the alignment, one can customize a motor as described herein with an amount of acceptable cogging without sacrificing force output. The solid steel stack also enables cooling ports to be more effectively machined in the stack. Cooling of the stack assembly may become more critical with higher speed, higher force and/or higher duty cycle applications.

As mentioned earlier, FIGS. 30-31 show embodiments of a primary stage comprising solid steel stacks 62. FIGS. 37-55 show other embodiments of a primary stage 200 comprising solid steel stacks 210. Referring specifically to FIGS. 37-44, the stage 200 has two stacks 210 each comprising inner and outer teeth members 212,214 with a magnet 216 disposed between the inner teeth of the stacks and a coil 218 extending between the inner and outer teeth of each stack. FIGS. 45-48, 51-55 also show solid steel stacks mounted in a housing to form a stage. Each stack comprises a generally U-shaped configuration defined by the outer tooth and the inner tooth members. The outer tooth member 214 defines an outer surface of a channel 220 in the stack and the inner tooth defines an inner surface of the channel 220 in the stack in which the coil is placed 218. As shown best in FIGS. 37-44, a ledge 221 may be formed on the inner tooth member 212 of each stack. The magnet 216 may be located against each ledge 221. FIG. 30 shows one embodiment with the magnet positioned toward the "back iron portion" of the stack and FIG. 44 shows an alternate embodiment with the magnet positioned closer to the bottom face of the teeth rather than against the "back iron portion" of the stacks. In the embodiment of FIG. 44, the magnet is centered within the coil with the coil completely covering the magnet. In the embodiment of FIG. 44, the channel opening may be formed larger than a width of the magnet 216. Thus, the coil may completely cover the magnet and extend toward the "back iron portion" of the stack. As a result, the coil tends to balance and direct the alternating magnetic flux between the inner and outer teeth. Accordingly, a solid steel stack may be machined as necessary with ledge dimensions, tooth widths, and channel opening and depth, among other features, to create the desired effects, for example, selecting an amount of un-alignment desired while providing a mounting surface for the magnet.

While the teeth of the solid steel stack may be aligned together so they match the pitch of the teeth of a platen secondary, each ledge may also be machined to shift the inner and outer teeth members 212,214 of one stack as desired for un-alignment and an amount of a reduction of cogging as desired as described in U.S. Pat. No. 7,230,355. For instance, referring to FIG. 37, the inner and outer teeth members of the right stack (i.e., right of the magnet) may be shifted, or the inner and outer teeth members of the left stack (i.e., left of the magnet) may be shifted. A shift of 5 to 30 degrees or more of a pole pitch relative between the left and right side may be introduced with each stack assembly to reduce cogging. Although the FIGS. 37-44 show un-alignment associated with a single stack primary stage, it is also possible to create un-alignment in one or more phases of a multi-phase primary stage. For instance, one or more stack assemblies shown in the primary stage of FIGS. 45-47 may be un-aligned to create an incremental skew associated with the primary stage. By providing a solid steel stack, the ledge dimensions may be machined as necessary for desired magnetic forces, for instance, as described in U.S. Pat. No. 7,230,355. A tooth thickness which is 45% of a pole pitch may be best in certain conditions while 40 or 50% may be better at other times. Providing a solid steel stack allows for ready adjustment of ledge dimensions and corresponding un-alignment, thereby providing manufacturing flexibility.

The stack outer teeth may be provided with the projections 70 allowing locations for mounting of the bearings 72 for the stage (FIGS. 30-31). The projections 70 may have threaded holes 68 that accept shoulder screws for securing roller bearings to the stack (FIGS. 30-31). The inner teeth may also have projections 73 to allow for support of the coil and to minimize the potential for the coil to impinge in the air gap (FIG. 30).

In one embodiment as shown in FIG. 44, the projections 70 on the outer tooth can be shaped to direct the magnetic flux towards the outer tooth while assisting in protecting the coil in the stack. For instance, by forming the outer teeth with projections and the inner teeth without projections, the magnetic flux pattern may be directed more effectively toward the outer teeth to reduce velocity variations or velocity ripple. With a transverse shorter inner tooth and a slot with vertical walls, more windings may be incorporated into the coil, and also the magnetic circuit within the stack may be stronger and more balanced. In contrast to a round slot, a rectangular shaped slot enables the windings to maintain better form around the magnet. A larger, for instance, a transverse longer, outer tooth tends to compensate for any imbalance in the alternating flux pattern between the inner and outer teeth, by providing a preferred flux path away from the inner tooth. In other words, any unbalance alternation in flux pattern between the inner and outer teeth caused by the coil's interaction with the inner tooth may be overcome by forming the shape of the outer tooth as necessary, for instance, increasing its traverse length. The solid steel stack enables the inner and outer teeth to be formed as necessary for this effect. The forming process may also include forming variations in the tooth widths or small projections or contours on the extremities of inner teeth to help retain the coil winding in the slot while positioning it near to the bottom of the tooth.

Figure 43:
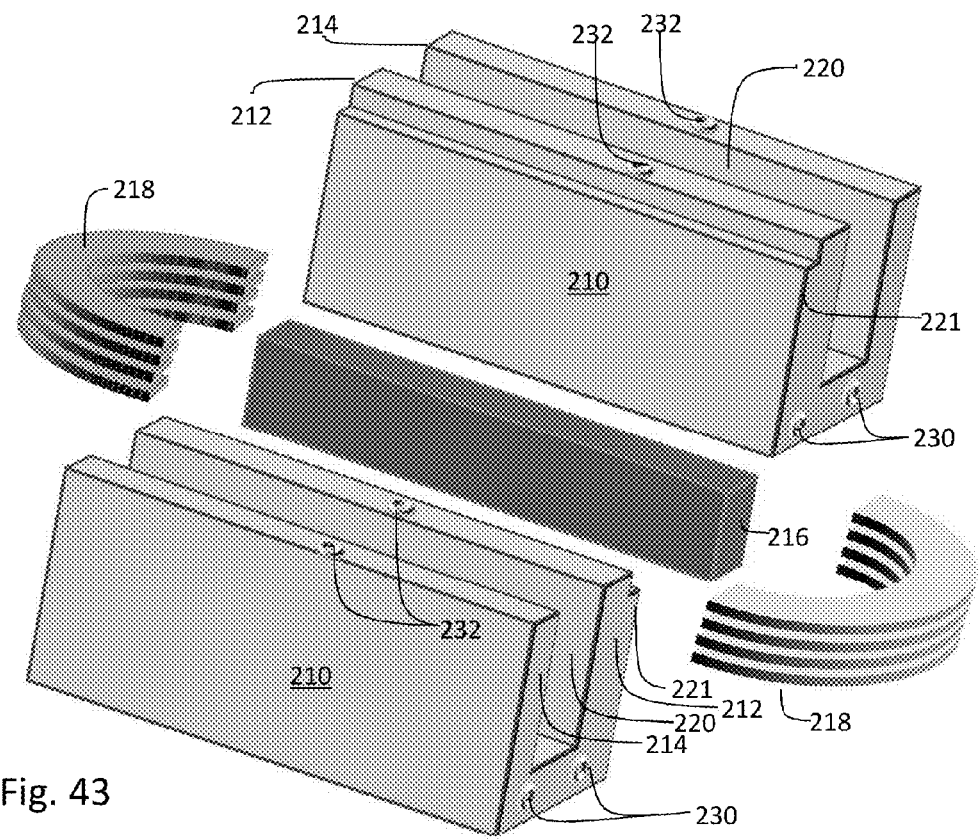
FIG. 43 is an exploded perspective view of an alternate embodiment of a primary stage showing the bottom face of the primary stage and gas bearing discharge ports for the primary stage.
Figure 44:
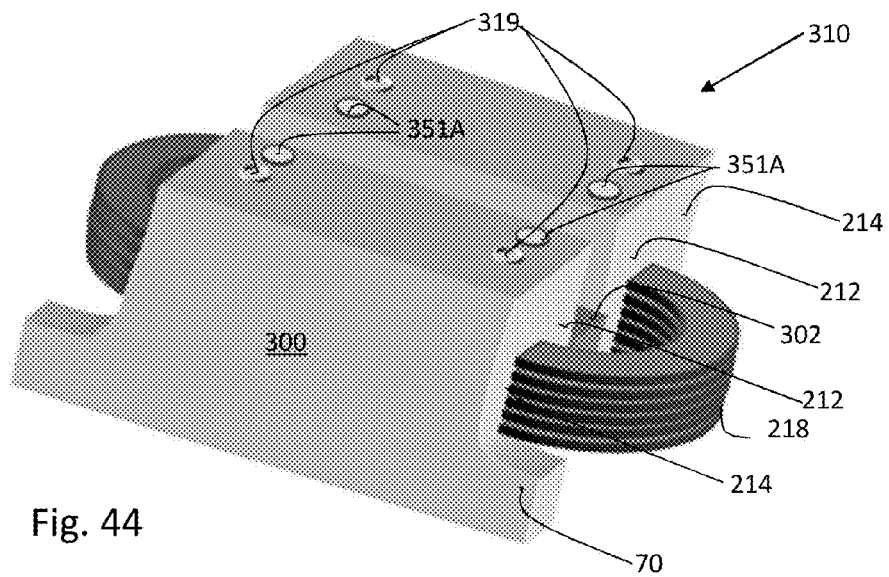
FIG. 44 is an alternate embodiment of the primary stage of FIG. 30.

The stacks may also be provided with internal passages 230 (FIG. 43). The internal passages provide internal cooling for the stacks. The internal passages may also be used for a gas bearing for the stage, in which case, the discharge port 232 for the gas bearing may be in one or more teeth of the stack(s) (FIG. 43), or through the epoxy surrounding the stack or stage (not shown), where the gas is discharged against the platen surface to form the gas bearing as disclosed in U.S. Pat. No. 7,566,997. The discharge ports 232 may also be used to discharge a cooling gas on to the platen to cool the stack as well as the secondary. The stacks may also have end user mounting holes 68, for instance, when the stacks form a housingless primary stage (FIGS. 30-31). The stacks may also have mounting holes and/or other locator features to allow the stacks to be mounted in the housing (FIGS. 45-48).

The primary stage 200 of FIGS. 37-42 has the bearing system embedded in the interior of the stack assembly to provide support to the middle of the secondary and to offset deflections caused by high magnetic loads between the secondary and primary. This is of particular concern with larger force, slow moving primaries with large pole pitches and/or wide stacks when combined with thinner or weaker secondaries, or where there is a lack of flatness associated with the secondary or flatness in the secondary that cannot be tightly controlled. Preferably, a bearing assembly 252 is installed in an interior recess 254 formed between the inner teeth 212 and below or on the ledge 221 to accommodate the bearing assembly. The magnet 216 may be located above the recess 254 and bearing assembly 252. The bearing assembly 252 comprises a low friction, non-magnetic bearing 256 with an axle 262 which is mounted in a saddle portion 258 of a bearing housing 260. The saddle portion 258 accommodates the axle 262 of the bearing. The bearing 256, axle 262, and the saddle portion 258 may be formed from a non-magnetic material such as stainless steel, brass, bronze, and/or plastic. The bearing housing 260 is dimensioned for relative sliding motion up and down (FIGS. 37,41,42) inside the recess between the stacks and under the magnet. In the alternative, the recess may be formed to extend partially into the inner tooth 212 to accommodate a larger bearing assembly.

Jackscrew holes 266 extend through the ledges 221 into the recess 254. The jackscrew holes may be threaded holes to threadably engage jack screws 268. To adjust the air gap, the jackscrews 268 may be threaded as necessary at the top of the stage 200 and the relative position of the bearing assembly 252 in the recess 254 may be adjusted. The jackscrews 268 may abut the bearing housing or threadably engage the housing. The jackscrews may also serve as mechanical stops to maintain the air gap for instance during the high magnetic preloads, and/or in the event the primary is subjected to shock or excessive vibration. If the bearing assembly needs replacement, the jackscrews provide a locator to quickly reestablish the required air gap.

Figure 45:
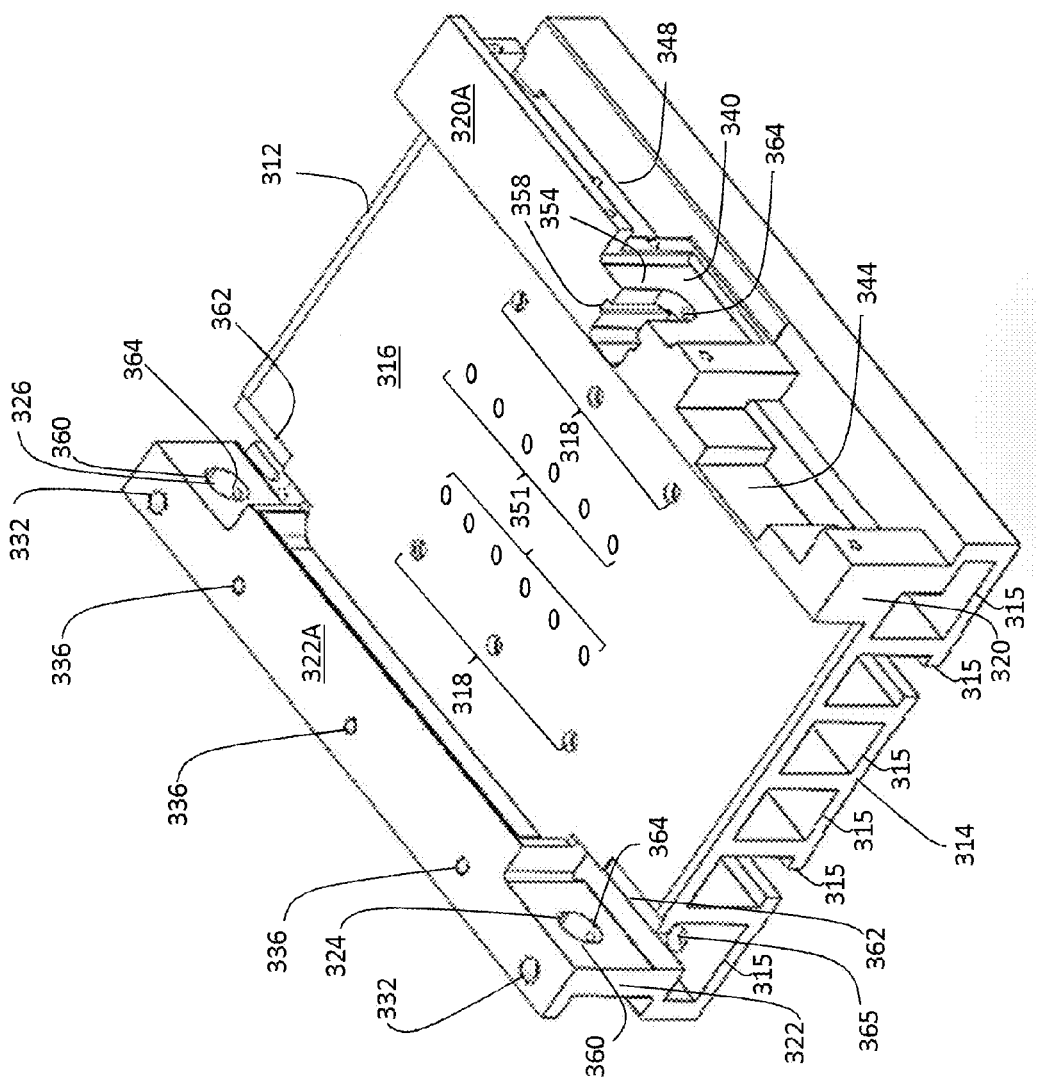
FIG. 45 is a bottom perspective view of a housing for a primary shown with bearings and stacks removed.
Figure 46:
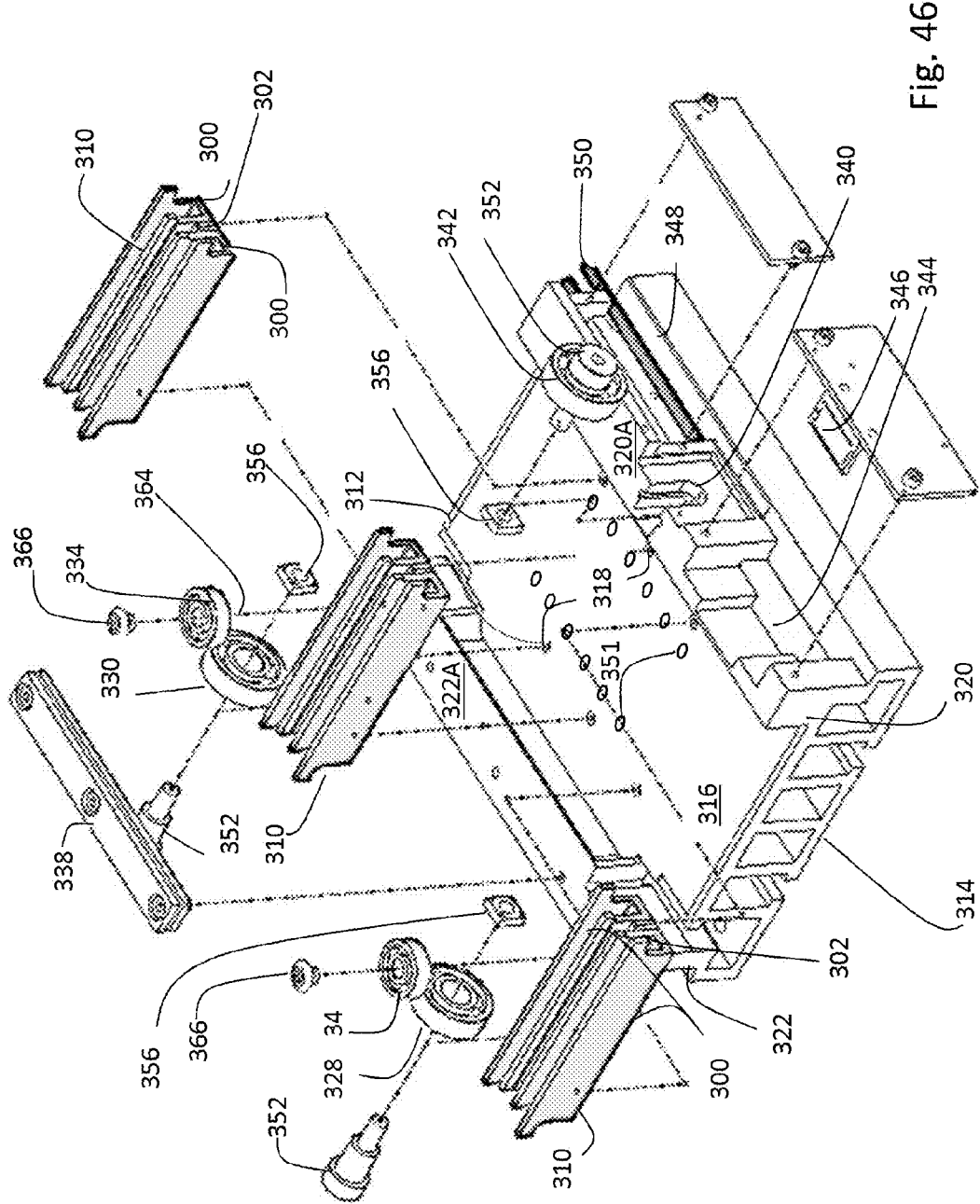
FIG. 46 is an exploded perspective view showing stacks and bearings associated with the housing of FIG. 45.

FIGS. 45-48 show an alternate embodiment of the linear drive motor primary with solid steel stacks 300 assembled with magnets 302 to form stack assemblies 310 installed in a housing 312 made of a non-ferrous material like aluminum. FIG. 45 shows the stack assembly 310 to be assembled with the housing 312. FIG. 46 shows further detail where the housing 312 comprises an extruded housing. The housing 312 includes a mounting surface 314 for the end user application. The housing shown in FIGS. 46-48 has six extruded passageways 315 adjacent the application mounting surface 314. The primary stage may be cooled by simple convection with ambient air passing through the extrusions as it moves, or, alternately, via pressure source which directs pressurized gas or fluid into one or more of the passageways 315. Preferably, the application mounting surface 314 includes T-slots that enable end user applications to be directly bolted to the housing. While the drawings show that the second and fifth passage ways 315 include slots for accommodating a T-nut for the application mounting surface 314, the mounting surface may also include other configurations as required by the end user. One or more of the extruded passageways, for instance, a passageway adjacent to the encoder, may have openings communicating with the two EMI shielded accesses for power connectors and the encoder read head in the upstanding wall 320, thus reducing cabling and connector requirements, and providing for cable management.

The housing comprises a stack mounting support surface 316 which is generally horizontal and arranged parallel to a platen of a secondary. The stack mounting support 316 includes locators 318 for mounting the stacks. The locators 318 on the stack mounting support may include mounting holes. The stack mounting holes (i.e., locators) 318 on the housing correspond to mounting holes 319 on the stack top surface thereby enabling the stack assemblies to be bolted directly to the extruded housing. In this way, the stack mounting holes may be precision drilled locators. The stack mounting surface locators may include other features including precision machined dowel pins, recesses or other keyed arrangements that allow the stacks to fit in a precise manner on the stack mounting surface. FIGS. 45-48 show locators 318 for mounting three stack assemblies 310 on the stack mounting surface. It should be appreciated that more or less may be used depending upon the application and the number of phases incorporated into the motor. For example, in the case of 3-phase motors, 3 locators for 3 stacks may be used for a "2-pole motor" (FIG. 45), or 6 locators for 6 stacks may be used for a "4-pole motor" (FIG. 49), the "4-pole motor" providing about twice the force. In another example, in the case of stepper motors, 2 locators for 2 stacks may be used for a "2-pole, 2-phase motor," or 4 locators for 4 stacks for either a "4-pole, 2-phase motor" or for a "2-pole 4-phase motor". An advantageous means to skew the locators will be disclosed later.

The housing has upstanding wall members 320,322 extending transverse to the stack mounting support 316 and defining longitudinal sides of the housing. The terms left and right will be used for ease of illustration in referring the housing shown in FIGS. 44-47 and is not intended to be limiting in any way. The wall members (reference character 320 indicates the right wall member and reference character 322 indicates the left wall member) provide mounting locations for bearings. The left and right side wall members have flat surfaces 320A, 322A which are perpendicular to the upstanding walls 320, 322 and parallel to the stack assembly support surface. The left side wall member 322 includes forward and aft bearing locators 324,326 for forward and aft bearings 328,330. The left side wall member flat surface 322A also provides a locators 332 for the side guide roller bearings 334, and locators 336 for the magnetic preload assembly 338 between the side guide bearing locators. The right side 320 wall member includes a centralized bearing mount locator 340 for a central bearing 342. The right side wall member 320 also includes an encoder read head locator 344 for an encoder read head 346. The encoder read head locator may comprise a ledge formed in the upstanding wall member 320. The encoder read head locator is preferably formed in an EMI shielded access in the housing. By providing an EMI shielding in the access with the encoder read head locator, the requirements for the encoder housing and the encoder cabling may be reduced and electromagnetic interference from other motor components may be reduced. The right side wall member 320 includes an access recess 348 for conduits 350 that direct pressurized gas into the housing 312 and/or the stacks assemblies 310 for cooling, and also depending on the application to form a gas bearing for the primary (not shown). The access recess 348 may also house wires and power supplies to the stack assemblies, in which case the access recess 348 may be shielded to prevent electromagnetic interference with other motor components, i.e., the encoder. By providing an EMI shielded access recess, the requirements for shielded power supply connectors are reduced. The access recess 348 may communicate with one or more of the extruded passageway 315 in the housing for cable management and routing to other components as necessary.

Because the top surface of the stack (i.e., the surface of the stack opposite the teeth) is flat and in direct contact with the housing via the stack mounting surface and locators, there is good thermal contact between the two and any excess heat generated by the stack may be dissipated through the housing. For instance, a plate with a cooling hose attached to a nipple extending through the plate may cover the end of a passage way 315 to allow cooling fluid to be directed through the extruded passageway. In a similar set-up, cooling fluid through a cooling hose may be directed into the extruded passageway and then to the stack assemblies and other components as necessary. For instance, ports 351 in stack mounting surface 316 may be brought into register with stack ports 351A machined in the stacks when the stack assemblies are mounted in the housing. When the stack assembly is mounted on the stack mounting surface, a fluid tight connection may be formed. For instance, O-rings may be installed in the ports and the stack conduits to create a fluid tight connection. Thus, the passageways in the housing may communicate directly with the stack conduits for cooling. As an example, in a vacuum or very high force and/or duty cycle application, the second or third extruded passageway and corresponding set of ports may be arranged to deliver influent cooling fluid to the stack assemblies, and the fourth or fifth extruded passageway and corresponding set of ports may be arranged to receive the effluent cooling fluid from the stack assemblies. Alternatively, for example, a gas, may be passed through the extruded passageways and into the ports 351 to enter the stacks and be discharged onto the platen, for instance, to establish a pressurize gas bearing. A threaded orifice may be added as needed to control the gas flow. In addition, with this arrangement, the cooling fluid (i.e., gas) not only cools the solid steel stack but also cools the secondary. Generally speaking, the carbon content in the materials forming the secondaries tends to increase heat generation. Although the secondaries described above have in general a lower carbon content due to their construction, and particularly, their thinner laminate construction material (0.06%-0.08% carbon content as compared to 0.18% typically found in the thicker secondaries used on other linear motors), directing pressurized cooling fluid through the stack and onto the platen is an effective means for cooling of the secondary. Alternatively, one or more of the extruded passageways may be rendered fluid tight to provide the desired path of cooling fluid flow through the primary and associated components. Alternatively, cooling fluid may flow through the housing passageways adjacent to the stack locators and provide cooling for the stack assemblies by the action of heat transfer through the stack mounting surface 316. Alternatively, cooling fluid may be flow from its source directly into the passageways 315 rather than from access 348 in any one of the methods described above. The cooling fluid may be liquid or gas.

The encoder read head locator 344, stack support surface 316, and stack mounting locators 318 are preferably machined and/or formed in the housing in a single setup to minimize variation and to synchronize (i.e., lock in) the electrical angle for the primary. Flat surfaces 320A,322A, and the side guide bearing locators 332 and/or magnetic preload assembly locators 336 may also be machined in the same set-up to minimize variation. Likewise, the bearing mounts 324,326,340 on the left and right upstanding wall members 320,322 may be machined in the same set-up to minimize variation. Thus, the flat surfaces 320A,322A are preferably parallel with stack assembly mounting surface 316. The encoder read head locator, central bearing mount, and forward and aft bearing mounts have mounting surfaces that are perpendicular to flat surfaces 320A,322A. The encoder read head locator, central bearing mount, and forward and aft bearing mounts have surfaces that are parallel to each other. All the critical dimensions for the primary stage are formed in one set-up thereby minimizing variation and providing accuracy and repeatability. In particular, because this method enables to the locators for the stacks, bearings, magnetic preload, and encoder to be formed with precise requirements for parallelism and perpendicularity, these critical components for the primary may be self-aligned by simply bolting them on and assembled onto the housing with lower requirements. In particular, the bearings will track properly and accurately on the platen thus reducing wear on the platen.

In summary, an exemplary housing as formed using the methods described herein allows for precise setup of seven critical bearing and stack mounting surfaces in four distinct planes. For example, the extruded housing 312 is arranged with left and right upstanding wall members 320,322 standing vertically. The upstanding wall flat surfaces 320A,322A along with the stack mounting surface 316 are machined, for instance, with a bottom of an end-mill, making them parallel to each other and creating a reference plane for subsequent operations. This allows the side guide bearings 334 to roll flat and perpendicular to the side face of the platen. Next, the forward and aft and central bearing mounting surfaces 324, 326,340 are machined with the side of an end-mill. This allows the main bearings 328,330,342 to travel parallel to each other and also to travel flat on the two main bearing surfaces. Next, the side guide bearing locators 332 and magnetic preload assembly locators 336 are formed by drilling and tapping holes. Thus, the two side bearings 334 and the main bearings 328, 330,340, as a group precisely travel on their respective bearing surfaces relative to the platen without introducing a skew or un-parallel motion in any of the three bearing surfaces which would cause premature bearing wear and failure. Then, the stack assembly locators may be formed by drilling mounting holes 318 into the housing. The encoder read head locator 344 may then be formed with the side of an end-mill assuring that the electrical angle for the primary is fixed. Any additional adjustment for cogging by "un-aligning" may then be made. A housing made in this fashion eliminates mounting and aligning components and bearings to a conventional carriage.

FIG. 46 shows an exploded view of the housing of FIG. 45. As shown in FIG. 46, the three stack assemblies 310 are mounted on the stack mounting support 316. The encoder read head 346 is received in the encoder read head locator 344. Three bearings 328,330,342 are used to guide the primary and support the high magnetic loads from the stacks. The central roller bearing 342 is inserted in a bearing locator 340 on the left side wall member 320, and a forward and an aft bearing 328,330 are inserted in bearing locators 324,326 on the right side wall member 322. The roller bearings 328,330, 342 are mounted to the upstanding walls 320,322 via shoulder bolts 352 extending through a center or inner race of the respective roller bearing. An inner diameter surface of the respective roller bearing inner race engages the shoulder of the shoulder bolt. On the right side wall member 320 bearing mount, the shoulder bolt 352 is directed through the inner race of the roller bearing and into a slot 354 where the shoulder bolt distal end is threaded into a square nut 356. The square nut 356 is arranged for sliding motion in a keyway 358 behind the slot 354. The keyway 358 engages both sides of the square nut and prevents rotation of the square nut 356 thereby facilitating tightening the shoulder bolt and positioning the bearing in the slot. Thus, on the right side wall member, the bearing 342 is positioned on the exterior of the right upstanding wall member between a head of the shoulder bolt and the upstanding wall. Shims or washers (not shown) may be used to engage the sides of the inner race and to stand the bearing off the upstanding wall. The arrangement on left side upstanding wall 322 is different. The left wall forward and aft bearing mounts 324,326 each include an elongated hole 360 through which the shoulder bolt 352 is directed. The shoulder bolt 352 is then directed through the inner race of the roller bearing where the shoulder bolt distal end is threaded into the square nut 356. Given the size of the square nut and its relative position in the elongated hole, the stack mounting support may be formed with a keyway 362 that engages at least one side of the square nut to prevent the nut from rotation as the shoulder bolt is tightened. Alternatively, a tool or wrench, may be used to prevent rotation of the square nut when tightening the shoulder bolt and positioning the bearing. Shims or washers (not shown) may be used to engage the sides of the inner race and to stand the bearing off the upstanding wall. Thus, on the left side wall member, each bearing 328,330 is positioned on the interior of the left upstanding wall member between the square nut and the upstanding wall. Although the drawings show one particular arrangement of the bearings in their respective bearing mounts, certain aspects of one or more of the bearing mounts may be used at one or more bearing mount locations as may be desired by the application.

Jackscrew holes 364 extend through each bearing mount 324,326,340. The jackscrew holes 364 may be threaded holes to threadably engage jackscrews (not shown) for each bearing mount. The jackscrews may be accessed through an access hole 365 in the application mounting surface 314 that extends to each bearing mount 324,326,340. As mentioned before, the jackscrews may be used to adjust the position of the bearing in the slot (i.e., right side bearing location) and/or elongated holes (i.e., left side bearing location), for instance, for setting the air gap of the primary. To adjust the air gap, the jackscrews may be threaded as necessary at access holes in the application mounting surface, and then the three shoulder screws 352 are tightened to make sure that the bearings are pressed firmly against their mounting respective mounting surfaces 324, 326,340. The bearing mount and locator surfaces allow the bearings self-align such that they are parallel to each other, and to their respective bearing surfaces. The jackscrews may abut the shoulder of the shoulder bolt. The jackscrews may also serve as mechanical stops to maintain the critical air gap in application involving high magnetic preloads, and/or in the event the primary is subjected to shock or excessive vibration. The jackscrews enable finely setting and maintaining minimum air gaps that may be critical in applications where force and/or torque is directly related to establishing and maintaining a very small air gap. Furthermore, if the bearing needs replacement, the jackscrews provide a locator to quickly reestablish the required air gap. Thus, downtime from preventative maintenance or bearing replacement is reduced as the mounting screws and bearings are easily assessable, and re-setting of the air gap is either not required or is greatly simplified.

The side guide roller bearings 334 are mounted by directing threaded end of the shoulder bolt 366 through threaded holes (i.e., locators) 332 formed in the horizontal portion 322A of the left side wall member 322. The edge of a bolt or a shoulder bolt 366 engages the inner race of the side guide bearing. Although the side guide bearings 334 may simply bolt on to the housing and self-align with the locators 332 as shown in the drawings, the side guide bearings may be arranged as the central bearing on the right side wall member with a slot and keyway thereby allowing the use of a jackscrew to adjust each side guide bearings as necessary, in the manner described above.

Figure 47:
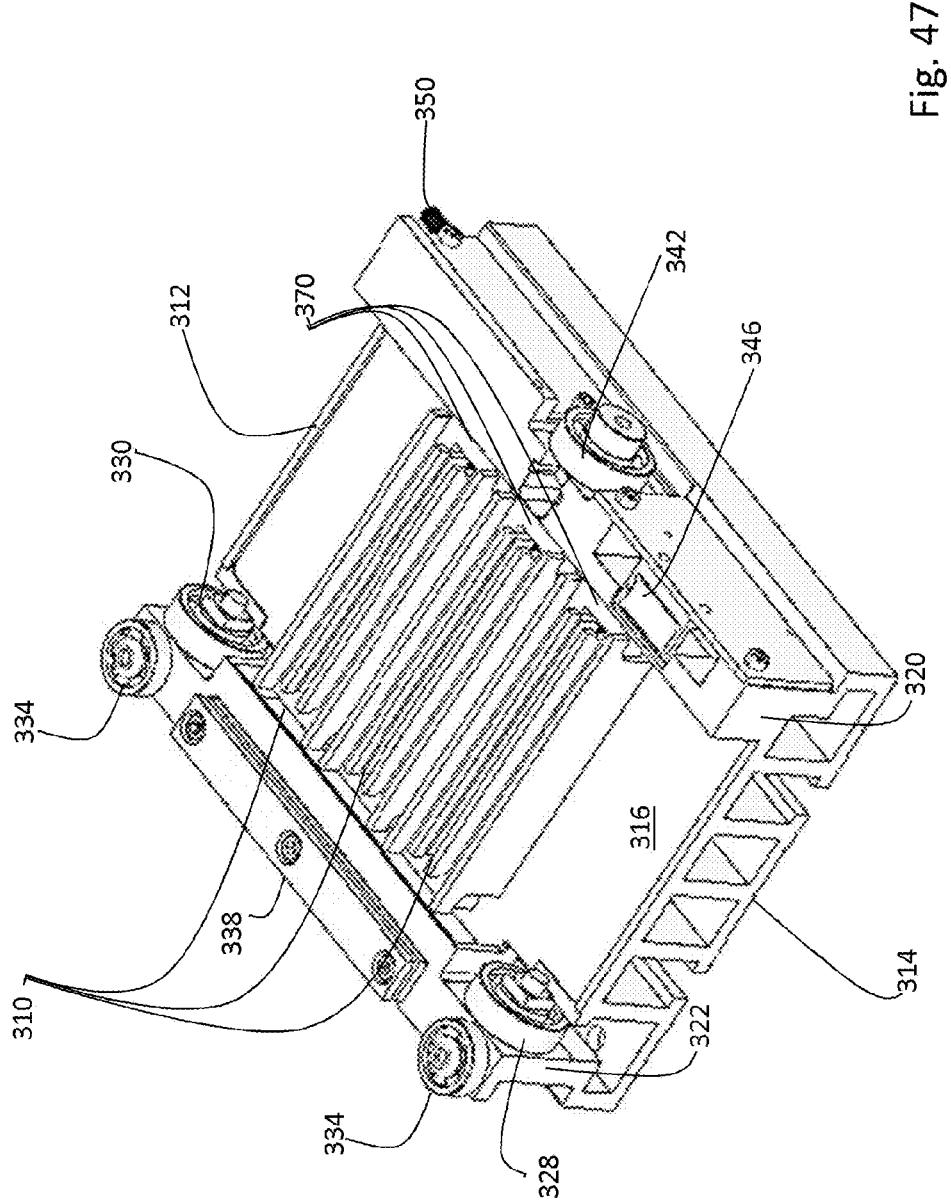
FIG. 47 is a perspective view showing the stacks and bearing components installed in the housing of FIG. 45.
Figure 48:
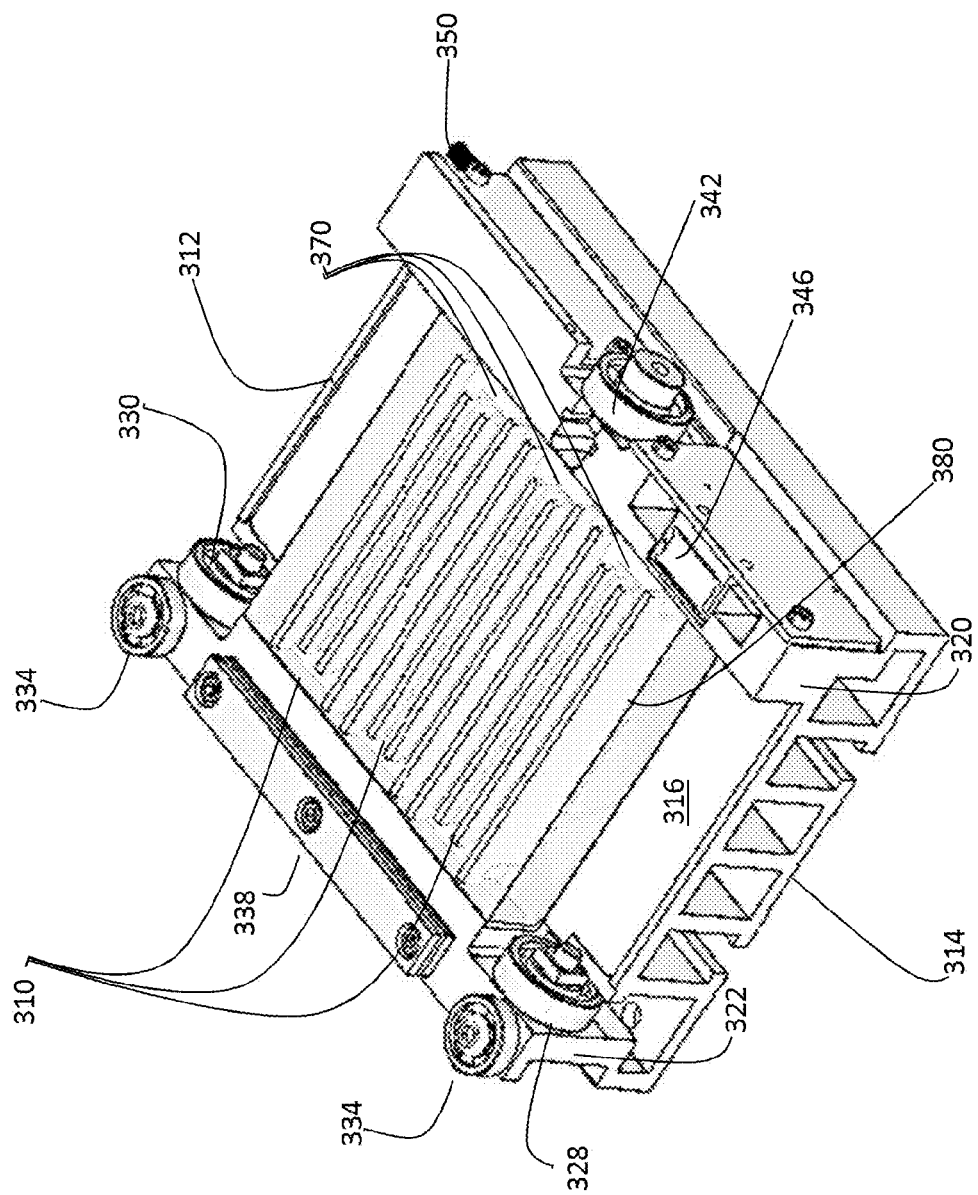
FIG. 48 is a bottom perspective view of a primary stage with installed stacks and bearings and applied and epoxy.

The housing 312 facilitates manufacturing and final assembly of the primary stage. The three stack assemblies 310 (i.e., two stacks with a magnet) may be mounted in the housing on the stack mounting support 316 using the stack locators 318. Windings 370 (FIG. 46) may then be disposed around each stack assembly 310. The stacks 300 each have projections on the outer teeth that facilitate in protecting the windings. The stacks 300 may have projections extending from the inner teeth to cover the windings. Alternatively, the inner teeth have little or no projections so to accommodate a coil with additional windings and/or to help balance the magnetic circuit as described above. The windings 370 may be dropped into position around the stack assemblies and may be in place near the bottom of the tooth and around the magnet as described above. The main load bearings 328,330,342 may be mounted in their respective mounts 324,326,340 on the upstanding wall members 320,322 of the housing 312. The encoder read head 346 may be mounted in the EMI shielded recess comprising the encoder read head locator 344 of the housing with mounting screws and a mounting plate. The side guide bearings 334 may be mounted in their respective bearing mounts 332 on the left side upstanding wall 332. The magnetic pre-load assembly 338 may be installed in its respective mount 336 on the left side upstanding wall 332. The magnetic pre-load assembly may have slotted mounting holes to allow for adjustment of the air gap between the platen and the preload assembly to create more or less magnetic attraction, as needed, to maintain the primary against the platen and prevents unwanted yaw motion when traveling along the platen. Power and pressurized gas connections may be directed through the EMI shielded access recess 348 or through the extruded passageways 315. The housing may be then treated with an epoxy 380. FIG. 47 shows an embodiment of the primary with epoxy 380 extending over the stack assemblies 310. FIG. 48 shows an embodiment of the primary without an epoxy extending over the stack assemblies 310. FIG. 47 also corresponds to the embodiment of FIG. 48 before the epoxy 380 is applied.

Figure 49:
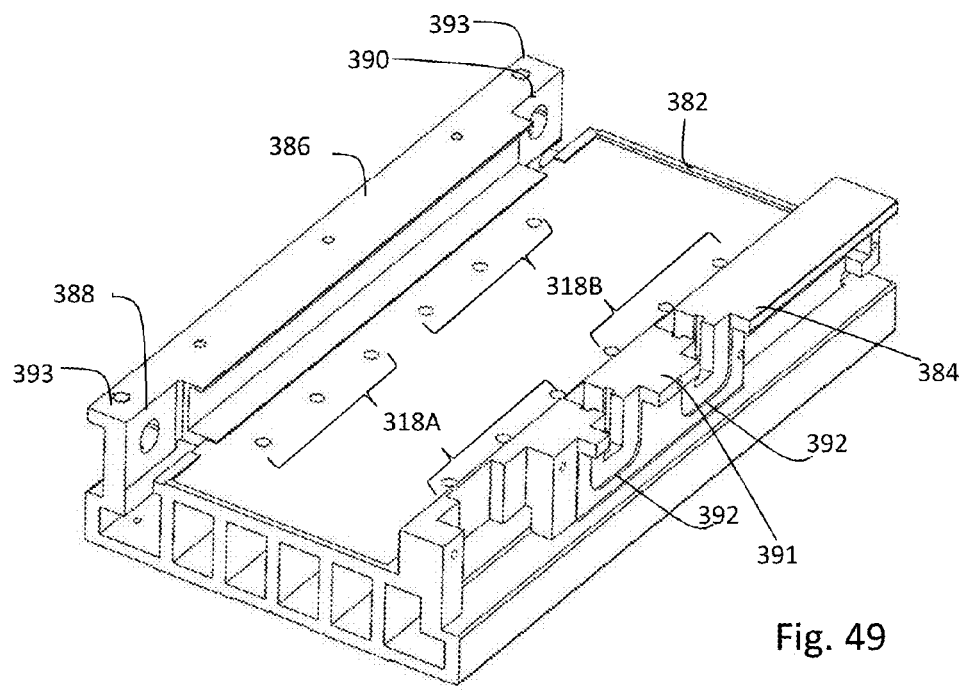
FIG. 49 is an alternate embodiment of a housing with an alternative bearing system and stack locator system to that shown in FIG. 45-47.
Figure 50:
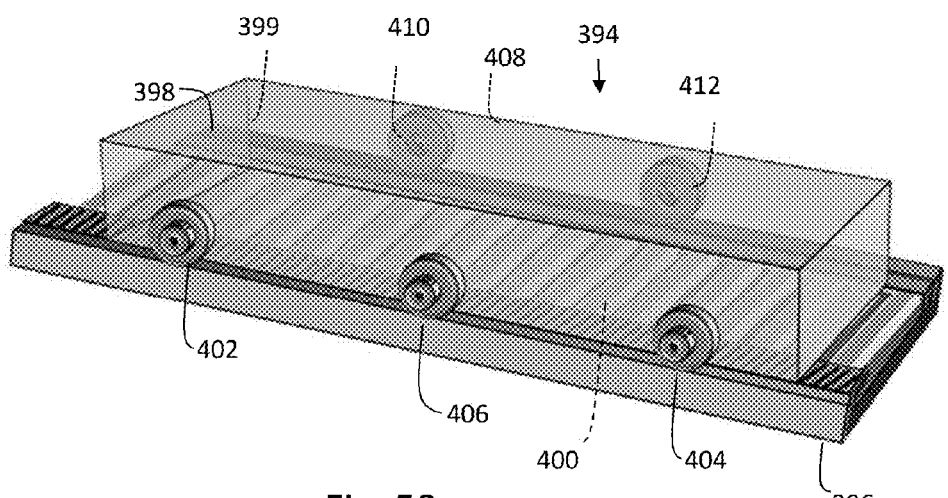
FIG. 50 is another embodiment of a primary stage with an alternative bearing system to that shown in FIG. 45-47 and FIG. 49.

Although the primary stage of FIGS. 45-48 is arranged with three roller bearings 328,330,342, other arrangements may also be used. FIG. 49 shows an alternate embodiment of the housing of FIG. 45-48. For the ease of illustration features common between the embodiment of FIGS. 45-48 and the embodiment of FIG. 49 have not been indicated in FIG. 49. In FIG. 49, the housing 382 has opposite left and right upstanding wall members 384,386. The left wall member 384 includes a forward bearing locator 388 and an aft bearing locator 390. The right wall 386 member includes a central bearing load point 391 comprising two bearing locators 392 for applications involving high magnetic loads between the primary and the secondary or applications where flatness of the secondary cannot be controlled. FIG. 50 shows an alternate embodiment of a linear drive motor 394 with a platen 396 and a primary 398 movable across the platen using five bearings. The primary 398 has a housing 399 (shown in phantom) with one wall member 400 having locators for a forward bearing 402, an aft bearing 404, and a central bearing 406; and the opposite wall member 408 having two bearing locators 410,412. In the embodiment of FIG. 50, the magnetic load assembly locator (not shown) may be disposed on the wall member 400 between the forward and central bearing locators 396,400, and/or between the aft and central bearing locators 398,400. In the embodiment of FIG. 50, the encoder read head locator may be arranged on the opposite side wall 402. Other combinations may also be used with additional bearings provided at each location depending upon the application. For example, there may be two bearing mounts at each location shown in the primary of FIG. 50. Preferably, the arrangement of the bearings on the left and right upstanding wall members is staggered.

Preferably, each bearing load point, whether it comprises two or more bearings grouped together at a particular location on the housing (i.e., the central bearing 392 of FIG. 49), or a single bearing at a particular location on the housing, are on opposite sides of the housing of the primary in non-adjacent positions. The number of bearings used at a particular location to create the bearing load point (an odd or even number) is not critical. In FIGS. 45-48, the main roller bearings 328, 330,342 create three bearing load points that are non-symmetric about the axis defined by the direction of travel of the primary but symmetric about the axis defined by a direction transverse to the direction of travel (i.e., bilaterally symmetric). In FIG. 49, the pair of bearings installed in the locator 392 creates the approximate bearing load point 391 on one side of the primary, and the bearings installed in the forward and aft locators 388,390 each create a bearing load point 393 on the other side of the primary. In FIG. 49, the arrangement of bearing is also bilaterally symmetric. By way of example, the housing of FIG. 49 includes 3 additional stack locators that may be used to provide an additional pole. The additional pole creates additional magnetic force between the primary and secondary. The additional bearing at the bearing load point 391 is used to counter the added magnetic loading. Similarly, the added bearing may be used at the bearing load point 391 (or any other bearing load point) to counter greater end user payloads for the motor. Similarly, in FIG. 50, each of the 5 bearings creates its own bearing load point with the near side wall having 3 bearing load points and the far side wall having 2 bearing load points, preferably, positioned between the 3 bearing load points on the opposite (near side) walls. Thus, the arrangement in FIG. 50 is bilaterally symmetric. The bilateral symmetric arrangement of bearing load points minimizes deflections of the secondary and assists in maintaining a critical air gap for the motor. The bearing(s) are moved to the center on one long side of the primary to minimize both the amount of deflections in the secondary and also the effect of the deflections. With the bilateral symmetric arrangement of bearings, critical defections in the secondary are minimized by inducing double bending stresses into the platen and motor housing rather than single bending stresses. In a bilateral symmetric arrangement of bearings, deflections in the primary housing and/or secondary platen caused by high magnetic loading between the primary and second may be minimized thereby assisting in maintaining a critical air gap. In turn, the secondary may be formed from thinner laminate construction as described before, and the motor may operate with a smaller air gaps and achieve greater force and more functionality, for instance, through a plurality of moving secondaries passing over an inverted primary. In an application involving a plurality of moving secondaries passing over an inverted stationary primary, the secondary is preferably a relatively thin member to reduce the mass that the primary is moving. In comparison to a bearing system with bearing load points on the corners of the housing of the primary, the bilaterally symmetric bearing system allows for a stable air gap at very small air gaps, an increase in motor force, an increase in motor reliability, and a reduction in the weight of the motor.

FIG. 49 also shows forming the locators for the stacks in a manner to achieve a desired amount of "un-alignment." The housing 382 may be formed such that the relative position of the first set of stack locators 318A (i.e., forward 3 pairs) is skewed from the second set of stack locators 318B (i.e., aft 3 pairs) relative to a tooth pitch on a corresponding secondary. Thus, the inner and outer teeth of the stacks in the second set of stack locators may be shifted relative to the pitch of the teeth of the platen secondary to reduce cogging. As mentioned before, the arrangement of stack locators 318A, 318B may be used in connection with a 3 phase, "4-pole motor." The housing shown in FIG. 49 illustrates scalability with the provision of a longer housing to accommodate additional stack assemblies for added phases or poles. Alternately, magnetic imbalance may be compensated for by inverting the phasing on the each of the phases in successive poles and then shifting the stack locators in the housing by 180 degrees. By reversing the polarity of a set of coils in a successive pole, non-linearities in flux may be compensated.

Figure 51:
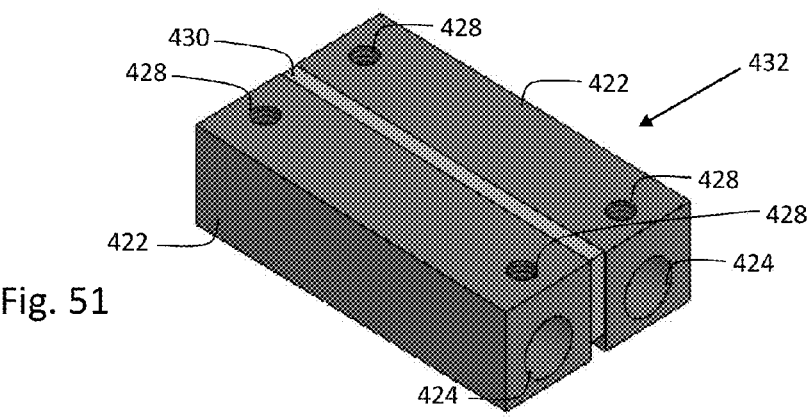
FIG. 51 is an alternate embodiment of a solid steel stack shown in a semi-finished machined state.
Figure 52:
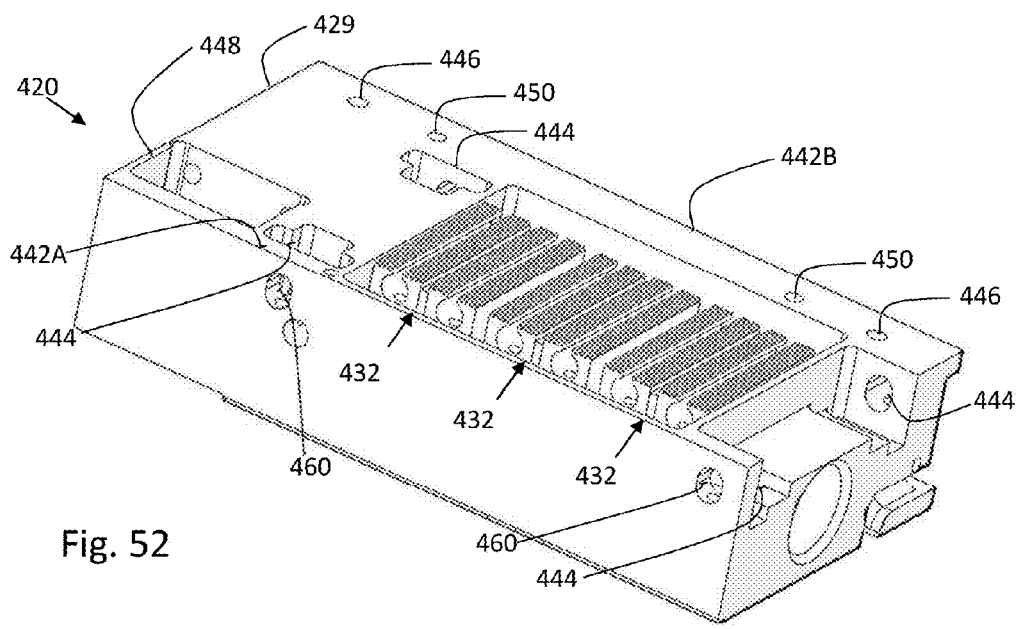
FIG. 52 is a bottom perspective view of an alternate embodiment of a housing with the stack of FIG. 51 mounted therein and finished machined with teeth and a slot.
Figure 53:
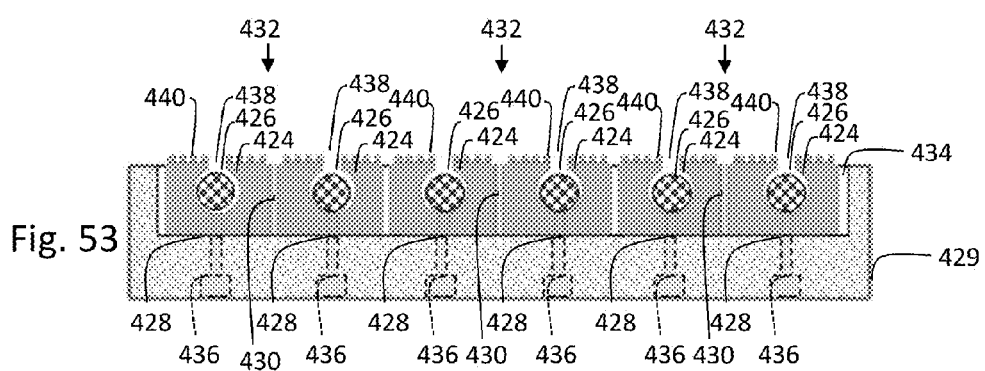
FIG. 53 is a cross sectional view of assemblies of stacks of FIG. 51 mounted on the housing of FIG. 52 and finished machined with teeth and slot, and coils installed in the stack assemblies.

FIGS. 51-55 show an alternate embodiment of a primary stage 420 for a linear drive motor where stacks 422 of the primary stage comprise rectilinear cross section members formed from solid steel. The solid steel stacks 422 may have a central opening 424 to accommodate a coil winding 426 and mounting surfaces 428 for attachment of the stack to a housing 429. The mounting surfaces 428 may comprise a threaded hole to allow the stack to be bolted in the housing 429 as shown in the drawings, and/or other locators, for instance, as described in the previous embodiments. A magnet 430 is disposed between two like stacks 422 to form a stack assembly 432. FIG. 51 shows the stack assembly with the stack in a semi-finish state. FIG. 52 shows the stack assembly in the housing in a finished state. FIG. 53 shows the stack assembly in the housing in a finished state with coil windings inserted in the stacks.

In one method of constructing the primary stage, stack assemblies 432 (i.e., stacks with a magnet disposed therebetween) having semi-finish dimensions may be mounted in an interior portion of a housing 434 using the stack locators formed in the stacks 428 and the housing, for instance, mechanical fasteners 436. The stacks and locators may incorporate any one of the aforementioned features. Then, the housing with installed stack assemblies 432 may go through a slotting operation to form a slot 438 in the bottom face of the stack that allows for the insertion of the coil windings 426 in the central openings of each stack. The stacks may have semi-finish dimensions that facilitate assembly with the housing as the stacks will be finished machined after assembly with the housing. Preferably, in the same setup, the housing with installed stack assemblies may go through a machining operation to finish machine the stacks, and particularly, finish machine the stack bottom surfaces with teeth 440. For instance, the stack teeth 440 may be finished machined to provide the desired motor pitch, desired amount of un-alignment to reduce cogging, and skew between successive stack assemblies, as described above. In small pitch motors, a series of stacks may be finish machined in one setup to produce various stack assemblies with precision formed teeth that may be aligned or un-aligned, as desired, without the need of an optical comparator to set various stacks of other phases of the motor and other components in the housing. The teeth 440 on the bottom face of the stacks may be arranged as a group in a pattern (i.e., tooth pitch) as necessary on the bottom face of the stack and a group of teeth need not fully occupy the face of the stack. For instance, in one embodiment, as shown in FIG. 53, the stacks may have their semi-finish width dimensions made slightly wider than a width needed to accommodate the number of teeth to be machined on the bottom face of the stack (i.e., four teeth on each side of the slot). The oversize semi-finish stack width dimension provides additional material on either side of the stack to facilitate the machining/manufacture of the teeth on the stacks and to allow for unalignment as may be required, and to account for any assembly variances. In an application involving a small pitch, the teeth of the stack assemblies may incorporate a skew to produce a stage with minimal cogging, which may be advantageous in low speed applications (i.e., scanning applications) where smoothness of motion is required. It should be appreciated that the individual stack assemblies may be machined to form skew for unalignment, and then assembled with the housing an optical comparator to ensure desired positioning.

Figure 54:
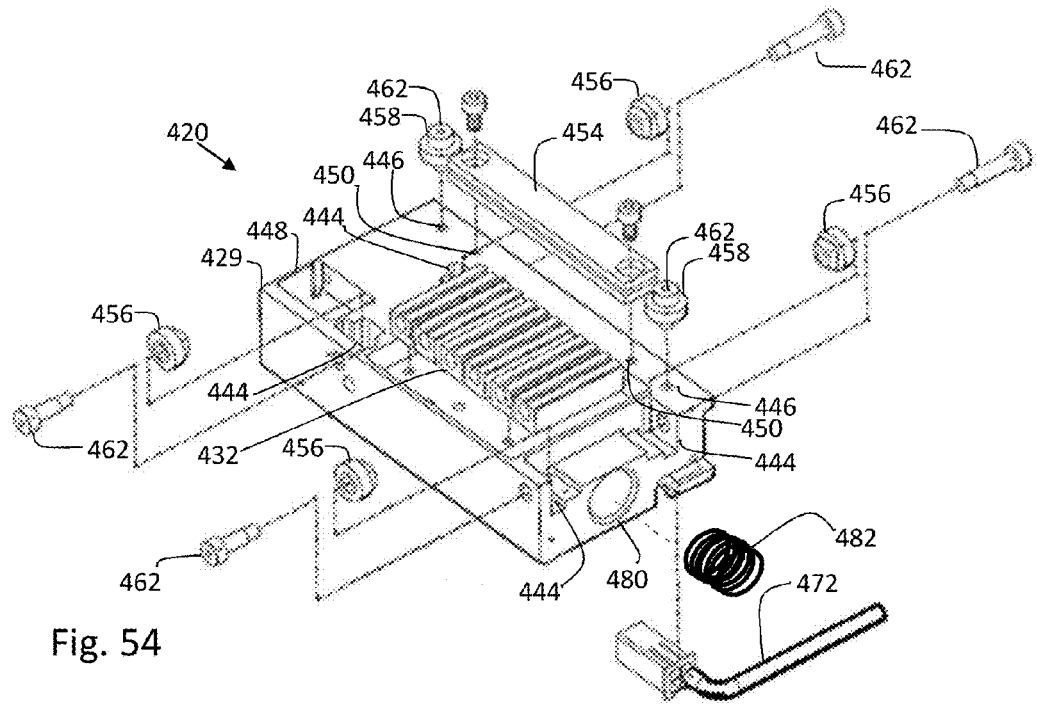
FIG. 54 is an exploded bottom perspective view of a primary incorporating the stacks of FIG. 51.
Figure 55:
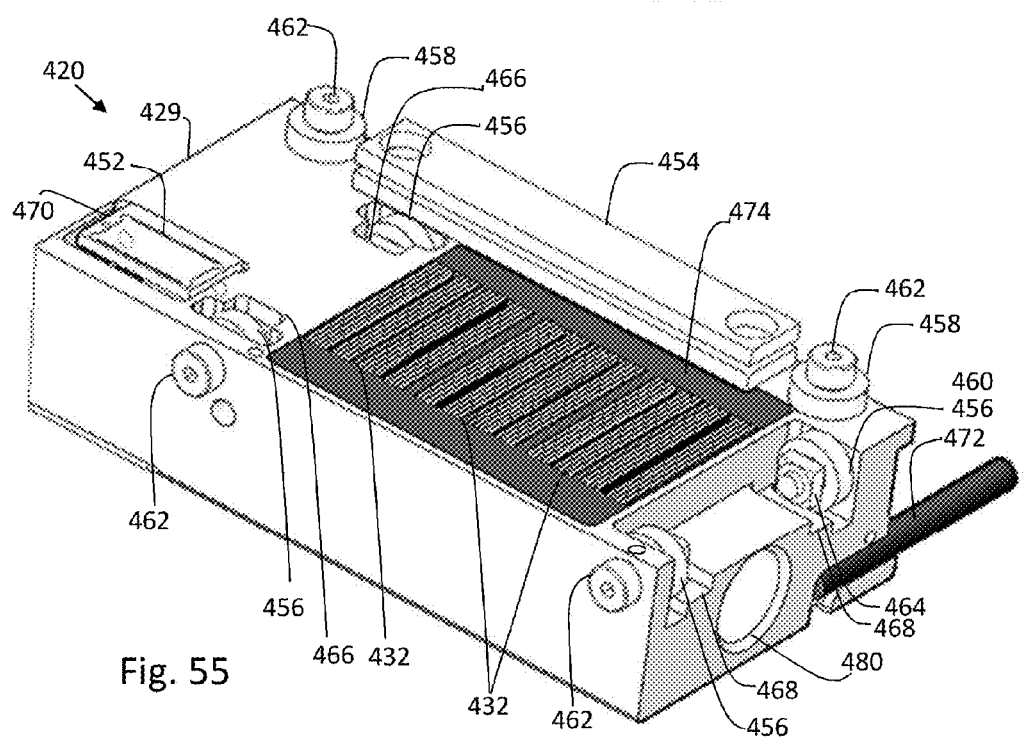
FIG. 55 is a bottom perspective view of the primary of FIG. 54.

FIGS. 52, 54, 55 show the primary stage 420 with the housing 429 having many of the features mentioned above. The housing 429 of FIGS. 52, 54, 55 may be an extruded housing with wall members 442A, 442B forming main bearings locators 444, side bearing locators 446, an encoder read head locator 448, and magnetic preload assembly locator 450. Afterwards, the housing with installed stack assemblies is machined to finish the features of the stack, the housing may have its other features finish machined to allow finish assembly of the encoder read head 452, magnetic preload assembly 454, and the main bearings 456, and the side guide bearings 458. The machining of the encoder read head locator 448 assists in locking the commutation electrical angle of the primary, as mentioned above. The housing may also include features for jackscrew holes 460, shoulder bolts 462, square nuts 464, a keyway 466, a ledge 468, EMI shielding 470 for the encoder read head access and related electronics, and other power cabling conduits 472 with EMI shielding on an opposite side (not shown), arranged in the manner described previously. The primary may also be potted with an epoxy 474. The motor teeth and encoder read head may use teeth on the secondary similar to that disclosed above. Constructing the primary in this way enables all of the critical components of the primary to be aligned and mated optimally to the platen, thereby locking the electrical commutation angles for the primary and secondary.

The primary shown in FIGS. 52,54,55 also includes an internal compartment 480 for housing a spring member 482. The spring 482 may be sized to respond to the weight of the primary and the end user payload for use in a vertical application (i.e., a gantry), and depending upon motor travel requirements, the spring may be sized to compensate for a relatively heavy payload when using a small primary. The spring also assists the primary in performing a "phase search" in a vertical orientation when the effects of gravity may otherwise prevent searching or when a commutation track feature as described above is not enabled in the drive. The spring may also be used to cushion the motor in the event of power loss.

The solid steel stack constructed in the manner described above may be used in a single axis motor, or a "dual axis" motor where semi-finished stack assemblies are mounted in an orthogonal orientation in a housing, and then the housing with mounted stack assemblies undergoes a slotting operation to enable the insertion of coils in the central openings of the stacks and a machining operation to finish machine the teeth in stacks in the desired orientation, pitch, unalignment, as described above. The machining operation may also include forming holes for a gas bearing as shown in co-owned U.S. Pat. No. 7,566,997.

While certain embodiments have been described in detail in the foregoing detailed description and illustrated in the accompanying drawings, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A primary for a linear drive motor:
    a stage comprising:
        a first stack being monolithically formed from a steel and having an inner tooth and an outer tooth being monolithically formed in the first stack, the inner tooth being spaced from the outer tooth in a manner such that the inner and outer teeth form a generally u-shaped cross-section for the first stack, the first stack having a bearing mount;
        a second stack being monolithically formed from a steel and having an inner tooth and an outer tooth being monolithically formed in the second stack, the inner tooth being spaced from the outer tooth in a manner such that the inner and outer teeth form a generally u-shaped cross-section for the second stack, the second stack having a bearing mount;
        a magnet disposed between the first and second stacks;
        a coil wrapped between the first and second stacks with an inner diameter portion of the coil circumscribing the inner teeth of the first and the second stacks and an outer diameter portion of the coil adjacent the outer teeth of the first and the second stacks; and
        a bearing operatively mounted to at least one of the bearing mounts of the first and second stacks.

2. The primary of claim 1 further comprising gas passages formed in the first and second stacks.

3. The primary of claim 1 further comprising mounting holes in a top surface of at least one of the first and second stacks.

4. The primary of claim 1, wherein the bearing mount of at least one of the first and second stacks comprises a projection extending from an outer tooth.

5. The primary of claim 4, wherein each of the outer teeth of the first and second stacks has a projection comprising the bearing mount.

6. The primary of claim 1, wherein bottom surfaces of the teeth are arcuate and conform to a curved secondary of the linear drive motor.

7. The primary of claim 1, wherein the stacks comprise an annealed low carbon steel.

8. The primary of claim 1, wherein the bearing mount of at least one of the first and second stacks comprises a recess formed the stack.

9. The primary of claim 8, wherein the inner teeth of the first and second stacks each have a ledge extending from their respective exterior surfaces with the magnet abutting the ledge.

10. The primary of claim 9, wherein the recess is formed adjacent to the ledge of the inner tooth of the stack.

11. The primary of claim 10, wherein the recess of the stack provides a mount for a bearing housing for the bearing.

12. The primary of claim 10, further comprising jack screws extending through the at least one stack adapted to position the bearing housing in at least one of the recess and pocket.

13. A primary for a linear drive motor comprising:
    a stack assembly comprising:
        a first stack being monolithically formed from a steel and having an inner tooth and an outer tooth with the inner tooth being spaced from the outer tooth in a manner such that the inner and outer teeth form a generally u-shaped cross-section for the first stack;
        a second stack being monolithically formed from a steel and having an inner tooth and an outer tooth with the inner tooth being spaced from the outer tooth in a manner such that the inner and outer teeth form a generally u-shaped cross-section for the second stack;
    a magnet disposed between the first and second stacks; and
    a coil wrapped between the first and second stacks with an inner diameter portion of the coil circumscribing the inner teeth of the first and the second stacks and an outer diameter portion of the coil adjacent the outer teeth of the first and the second stacks; and
    a housing with a first upstanding wall member spaced from a second upstanding wall member to define an interior of the housing, the stack assembly being mounted in the housing interior with the first and second stacks positioned across the housing interior in a first direction between the first and second upstanding walls, the housing first upstanding wall member having a first bearing mount outboard of the outer tooth of the first stack and a second bearing mount outboard of the outer tooth of the second stack, the housing second upstanding wall member having a third bearing mount in staggered relationship with the first and second bearing mounts.

14. The primary of claim 13, wherein at least one of the first, second and third bearing mounts comprises a slot formed in the respective upstanding wall.

15. The primary of claim 14, further comprising a roller bearing operatively mounted in the slotted bearing mount.

16. The primary of claim 15, further comprising a shoulder bolt extending through an inner race of the roller bearing and the slot in mounting the roller bearing to the slotted bearing mount.

17. The primary of claim 16, further comprising a jack screw hole extending through the slotted bearing mount.

18. The primary of claim 17, further comprising a jack screw extending through the jack screw hole to engage the shoulder bolt.

19. The primary of claim 18, further comprising a nut threadably engaging the shoulder bolt in mounting the roller bearing to the slotted bearing mount.

20. The primary of claim 19, wherein the nut and jackscrew position the shoulder bolt and bearing in the slot.

21. The primary of claim 19, further comprising a keyway adjacent the slot configured to engage at least one side of the nut to prevent rotation thereof in mounting the roller bearing to the slotted bearing mount.

22. The primary of claim 19, further comprising a keyway adjacent the slot configured to engage at least two sides of the nut to prevent rotation thereof in mounting the roller bearing to the slotted bearing mount.

* * * * *